US006851715B2

(12) United States Patent
Devereaux et al.

(10) Patent No.: US 6,851,715 B2
(45) Date of Patent: Feb. 8, 2005

(54) APPARATUS FOR MEASURING TENSION IN SEAT BELT WEBBING

(75) Inventors: Scott D. Devereaux, Rochester, MI (US); Randall J. Wolyniec, Macomb Township, MI (US); Michael Badyna, Wixom, MI (US); Brian P. Malott, Armada, MI (US); Neal H. Delventhal, Lake Orion, MI (US); Bob McFalls, Shelby Township, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 7 days.

(21) Appl. No.: 10/095,912

(22) Filed: Mar. 12, 2002

(65) Prior Publication Data

US 2003/0184076 A1 Oct. 2, 2003

(51) Int. Cl.$^7$ ............................................. B60R 22/195
(52) U.S. Cl. .................... 280/806; 73/862.393; 297/480
(58) Field of Search ............................... 280/806, 801.1; 297/480; 73/862.393, 862.392, 892.391

(56) References Cited

U.S. PATENT DOCUMENTS

| 3,737,849 | A | 6/1973 | Mead |
| 3,817,093 | A | 6/1974 | Williams |
| 3,994,162 | A | 11/1976 | Auckland et al. |
| 4,141,245 | A | 2/1979 | Brandstetter |
| 4,265,110 | A | 5/1981 | Moulin |
| 4,587,852 | A | 5/1986 | Butler et al. |
| 4,629,902 | A | 12/1986 | Hank et al. |
| 4,846,000 | A | 7/1989 | Steinseifer |
| 4,989,450 | A | 2/1991 | Shoberg et al. |
| 5,039,834 | A | 8/1991 | Obara et al. |
| 5,181,739 | A | 1/1993 | Bauer et al. |
| 5,342,251 | A | 8/1994 | Kanehara et al. |
| 5,517,863 | A | 5/1996 | Sodermalm |
| 5,728,953 | A | 3/1998 | Beus et al. |
| 5,960,523 | A | 10/1999 | Husby et al. |
| 5,965,827 | A | 10/1999 | Stanley et al. |
| 5,996,421 | A | 12/1999 | Husby |
| 6,041,666 | A | 3/2000 | MacKarvich |
| 6,081,759 | A | 6/2000 | Husby et al. |
| 6,161,439 | A | 12/2000 | Stanley |
| 6,230,088 | B1 | 5/2001 | Husby |
| 6,336,371 | B1 * | 1/2002 | O'Boyle ..................... 73/865.9 |
| 6,400,145 | B1 * | 6/2002 | Chamings et al. ...... 324/207.26 |
| 6,583,367 | B2 * | 6/2003 | Wolfe et al. ............. 280/801.1 |
| 2003/0089544 | A1 * | 5/2003 | Greib et al. ................ 180/268 |

FOREIGN PATENT DOCUMENTS

| JP | 2001354114 A | * | 12/2001 | ........... B60R/22/48 |
| JP | 2002019581 A | * | 1/2002 | ........... B60R/22/48 |

OTHER PUBLICATIONS

"Co–pending U.S. Appl. No. 09/818,126, filed Mar. 27, 2001 entitled Belt Tension Sensing Apparatus".

* cited by examiner

*Primary Examiner*—Peter C. English
(74) *Attorney, Agent, or Firm*—Tarolli, Sundheim, Covell & Tummino L.L.P.

(57) ABSTRACT

An apparatus (10) comprises seat belt webbing (24). An elongated member (30) is connected with the seat belt webbing (24). Tension in the seat belt webbing (24) is transmitted to the elongated member (30). An arm (106) is associated with the elongated member (30). The arm (106) receives a force from the elongated member (30) when tension in the seat belt webbing (24) increases. The force acts on the arm (106) through a moment arm creating a torsion force on the arm (106). At least a portion of the arm (106) moves in response to the torsion force. A device (102) is responsive to movement of the at least a portion of the arm (106) due to the torsion force to provide an output signal indicative of the tension in the seat belt webbing (24).

91 Claims, 12 Drawing Sheets

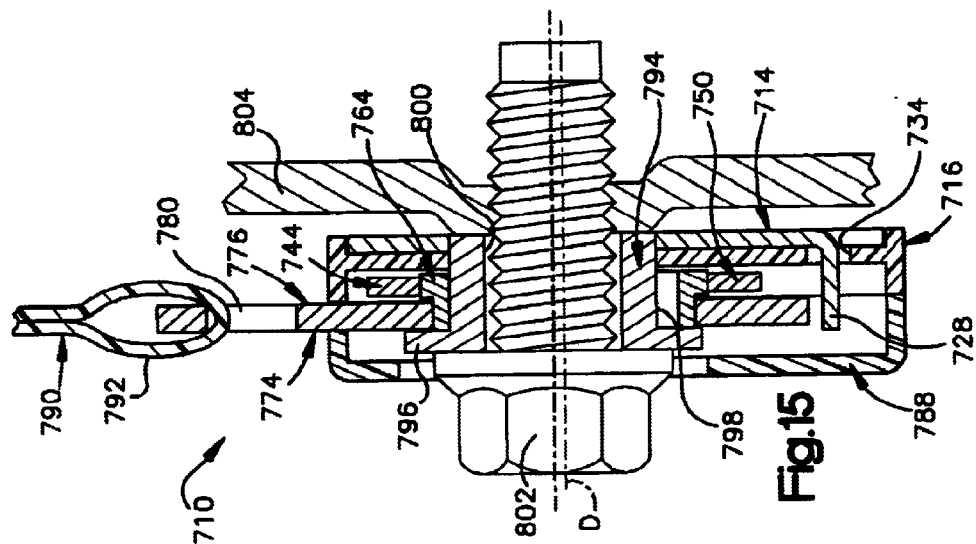
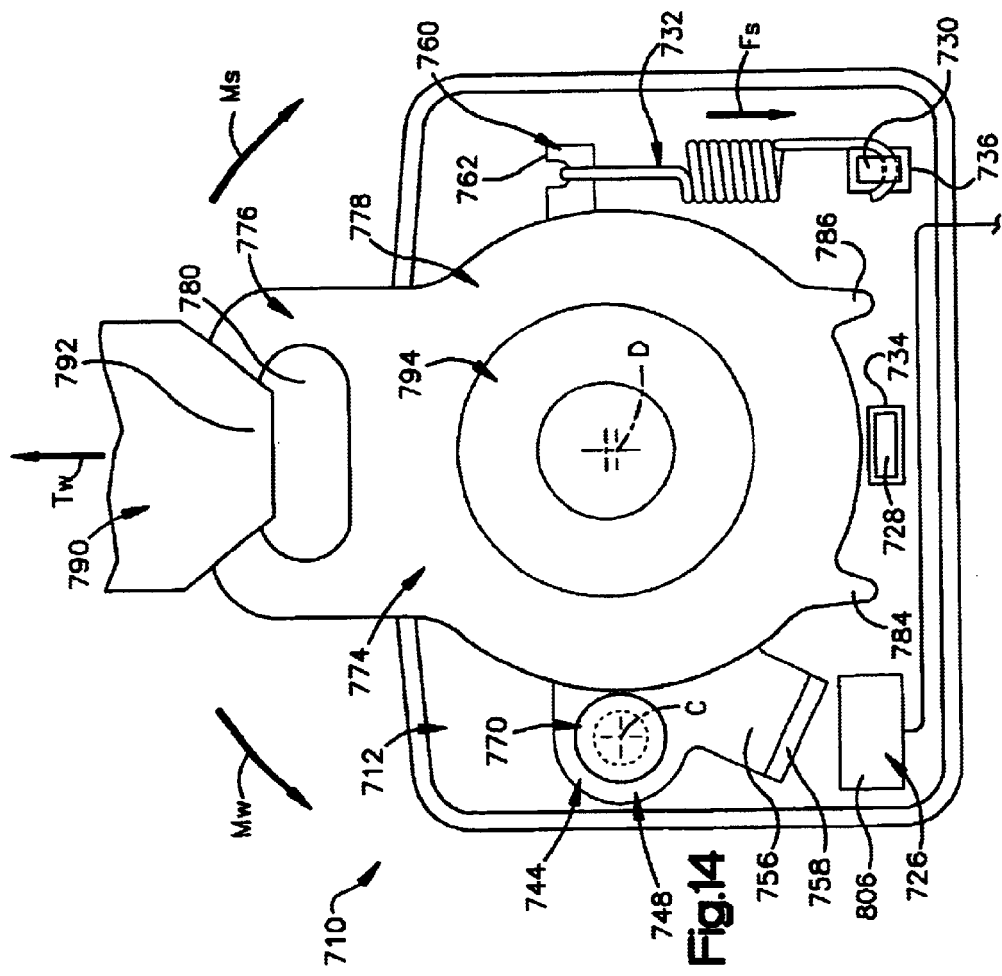

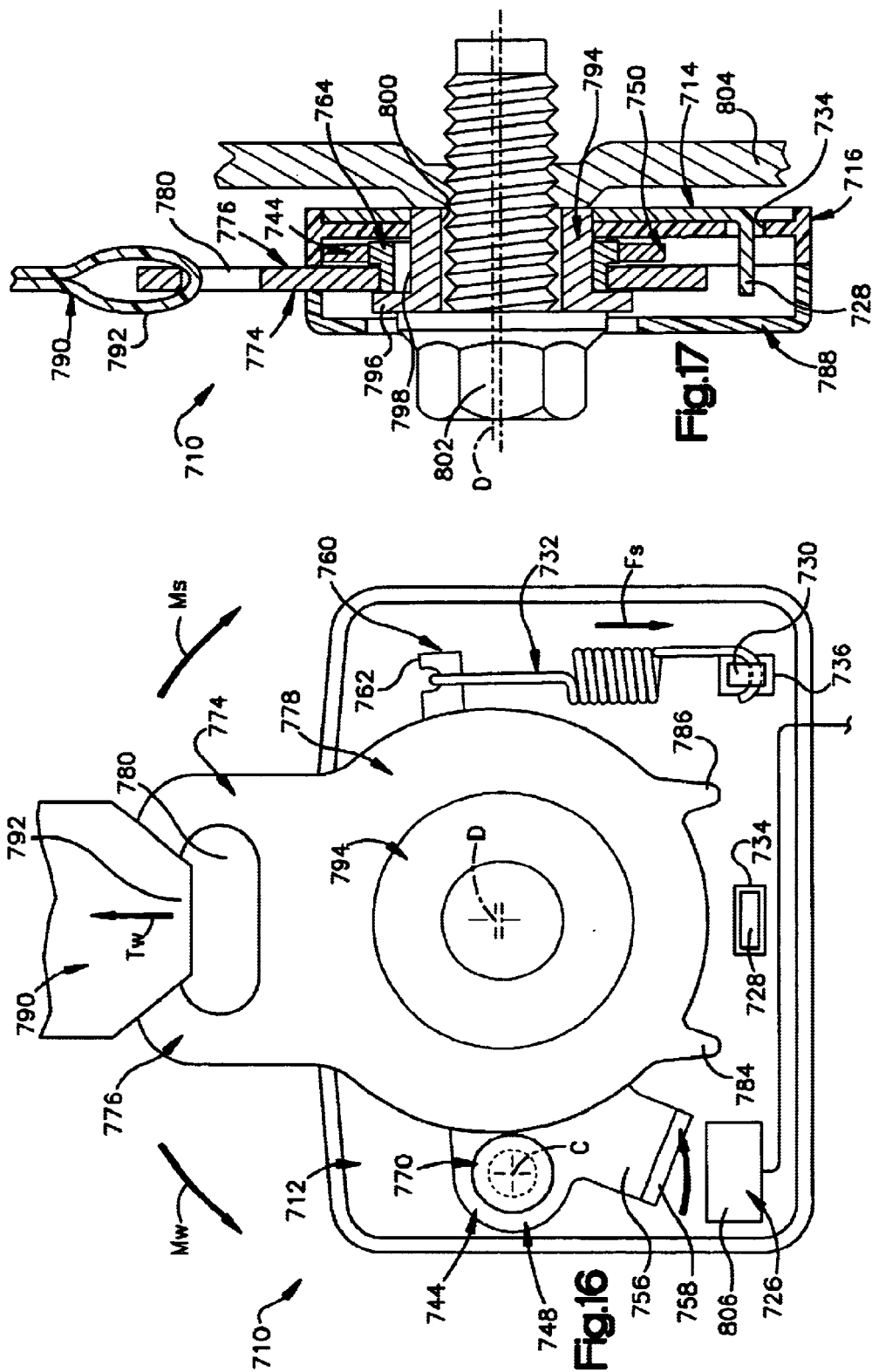

APPARATUS FOR MEASURING TENSION IN SEAT BELT WEBBING

TECHNICAL FIELD

The present invention relates to an apparatus for measuring tension in seat belt webbing of a seat belt assembly associated with a vehicle seat.

BACKGROUND OF THE INVENTION

A system for determining the weight of an occupant on a vehicle seat is known. The system outputs a signal indicative of the weight of the occupant to a controller. The controller controls actuation of a vehicle safety device, such as an air bag or pretensioner. The controller, upon the occurrence of a crash condition, considers the weight of the occupant when determining whether the vehicle safety device is should be actuated. The vehicle safety device is actuated when the weight on the seat is determined to be greater than a threshold level.

When a child safety seat is located on the seat, it may be desirable to prevent actuation of the vehicle safety device. Typically, seat belt webbing associated with the seat holds a properly installed child safety seat is firmly on the seat. The tension of the seat belt webbing holding the child safety seat on the seat may result in the weight sensed by the vehicle occupant weight sensor being above the threshold level. When the tension in the seat belt webbing is known, the controller of the system may determine a "true" weight on the seat by subtracting the load on the seat caused by the tension in the seat belt webbing from the weight sensor measurement.

SUMMARY OF THE INVENTION

The present invention relates to an apparatus comprising seat belt webbing. The apparatus also comprises an elongated member connected with the seat belt webbing. Tension in the seat belt webbing is transmitted to the elongated member. An arm is associated with the elongated member. The arm receives a force from the elongated member when tension in the seat belt webbing increases. The force acts on the arm through a moment arm creating a torsion force on the arm. At least a portion of the arm moves in response to the torsion force. The apparatus still further includes a device responsive to movement of the at least a portion of the arm due to the torsion force to provide an output signal indicative of the tension in the seat belt webbing.

In another aspect, the present invention relates to an apparatus comprising seat belt webbing. An elongated member is connected with the seat belt webbing. Tension in the seat belt webbing is transmitted to the elongated member. The apparatus also includes a sensor comprising an arm and a device. The arm is associated with the elongated member. The elongated member moves at least a portion of the arm in response to a change in tension in the seat belt webbing. The device is responsive to movement of the at least a portion of the arm to provide an output signal indicative of the tension in the seat belt webbing. The apparatus still further includes structure for reducing a variable moment acting on the arm as a result of off-axis loading of the seat belt webbing.

In yet another aspect, the present invention relates to an apparatus comprising seat belt webbing. An elongated member is connected with the seat belt webbing. Tension in the seat belt webbing is transmitted to the elongated member. An arm is associated with the elongated member. The elongated member moves at least a portion of the arm in a first direction in response to an increase in tension in the seat belt webbing. An overtravel stop extends through a portion of the arm. The overtravel stop contacts the arm after movement of the arm in the first direction by a predetermined amount. The overtravel stop prevents continued movement of the arm in the first direction and carries loads associated with further increases in tension in the seat belt webbing. The apparatus also includes a device responsive to movement of the at least a portion of the arm to provide an output signal indicative of the tension in the seat belt webbing.

In a further aspect, the present invention relates to an apparatus comprising seat belt webbing. An elongated member is connected with the seat belt webbing. Tension in the seat belt webbing is transmitted to the elongated member. An arm is associated with the elongated member and receives a load from the elongated member. The elongated member moves at least a portion of the arm in a first direction in response to an increase in tension in the seat belt webbing. The apparatus also comprises a biasing element for biasing the arm in a second direction opposite the first direction and a sensor responsive to movement of the at least a portion of the arm to provide an output signal indicative of the tension in the seat belt webbing. The biasing element and the sensor are located out of a path of the load applied by the elongated member to the arm.

In another aspect, the present invention relates to an apparatus comprising seat belt webbing. The apparatus also includes a seat belt webbing pretensioner comprising an elongated member connected with the seat belt webbing. Tension in the seat belt webbing is transmitted to the elongated member. The pretensioner also comprises an actuatable source of energy for, when actuated, moving the elongated member to tension the seat belt webbing. The apparatus still further includes a sensor for sensing tension in the seat belt webbing. The sensor comprises an arm that is supported by the pretensioner and is associated with the elongated member. The elongated member moves at least a portion of the arm relative to the pretensioner in response to a change in tension in the seat belt webbing. The sensor further comprises a device that is responsive to relative movement between the at least a portion of the arm and the pretensioner to provide an output signal indicative of tension in the seat belt webbing.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 14 is an elevation view of the embodiment of FIG. 11 illustrating an arm in an initial position;

FIG. 15 is a cross-sectional view of the apparatus of FIG. 11 illustrating an arm in an initial position and further illustrating a cover and a mounting bolt;

FIG. 16 is an elevation view of the embodiment of FIG. 11 illustrating the arm in a position away from the initial position; and FIG. 17 is a cross-sectional view of the apparatus of FIG. 11 illustrating the arm in a position away from the initial position and further illustrating a cover and a mounting bolt.

DETAILED DESCRIPTION OF THE INVENTION

Figure 1:
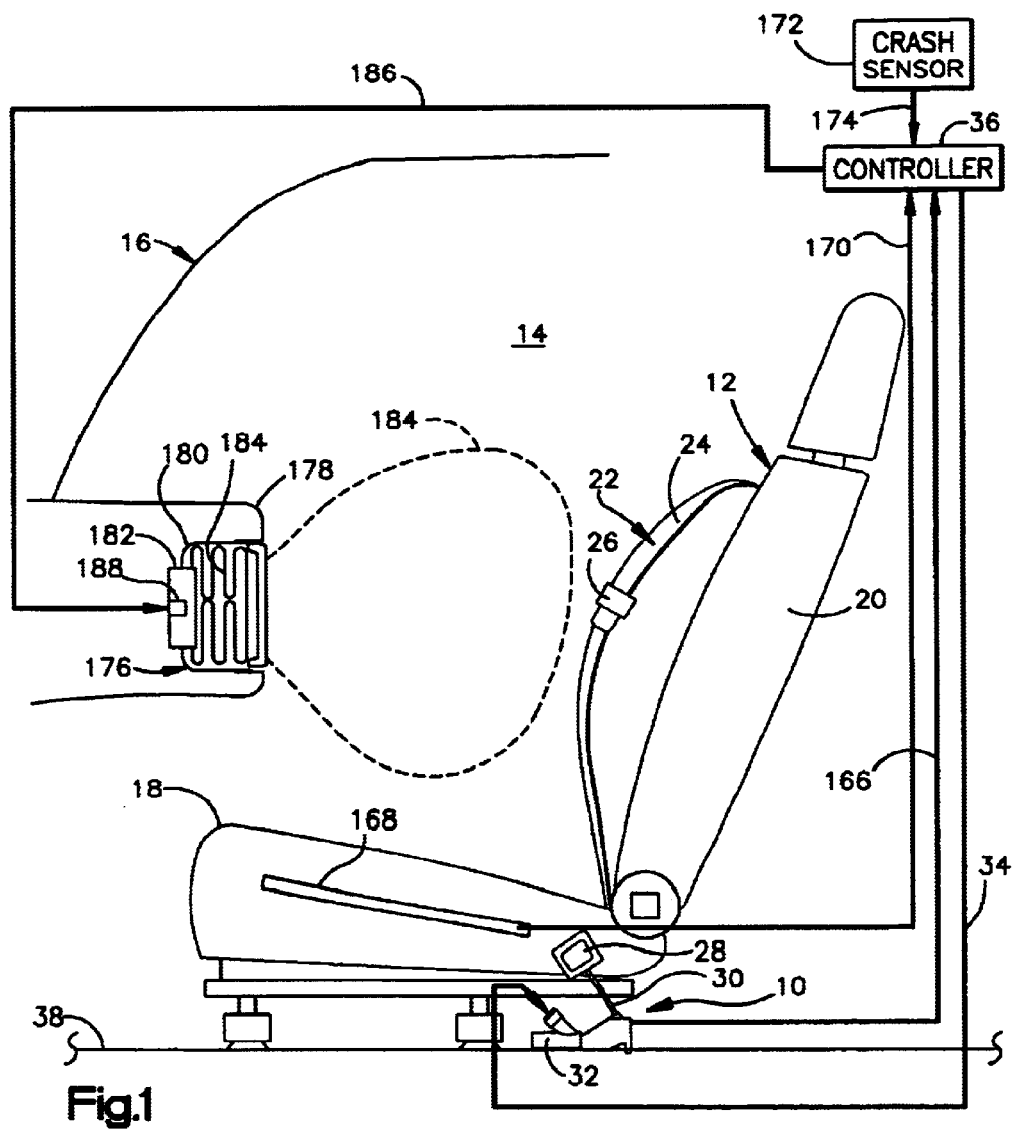
FIG. 1 is a schematic view of an apparatus, constructed in accordance with the present invention, and mounted adjacent a vehicle seat.

FIG. 1 illustrates an apparatus 10, constructed in accordance with the present invention, mounted adjacent a vehicle seat 12 in the passenger compartment 14 of a vehicle 16. Although the seat 12 illustrated is a front passenger seat, the apparatus 10 may be associated with any of the vehicle seats. The seat 12 includes a cushion portion 18 and a back portion 20.

A seat belt assembly 22 is associated with the seat 12 for helping to restrain an occupant of a vehicle 16 in the vehicle seat 12. The seat belt assembly 22 illustrated in FIG. 1 is a three-point continuous loop seat belt assembly. The seat belt assembly 22 includes a length of seat belt webbing 24 that is extensible about a seated occupant. A tongue 26 is attached to the seat belt webbing 24. The position of the tongue 26 on the seat belt webbing 24 is adjustable.

A buckle assembly 28 for receiving the tongue 26 is shown on the left side, as viewed in FIG. 1, of the seat 12. An anchor line or cable 30 extends from the buckle assembly 28 to a pretensioner 32. The anchor cable 30 is preferably a wire rope cable. As an alternative to the anchor cable 30, seat belt webbing, a metal strap, or any other elongated and relatively flexible member may be used. As is shown schematically in FIG. 1 at 34, the pretensioner 32 is electrically connected to a controller 36. Upon receipt of an actuation signal from the controller 36, the pretensioner 32 is actuatable to tension the seat belt webbing 24. When actuated, the pretensioner 32 pulls the anchor cable 30, causing the buckle assembly 28 to move downwardly toward a floor 38 of the vehicle 16. When the tongue 26 is fastened in the buckle assembly 28, the downward motion of the buckle assembly 28 creates tension in the seat belt webbing 24.

Figure 2:
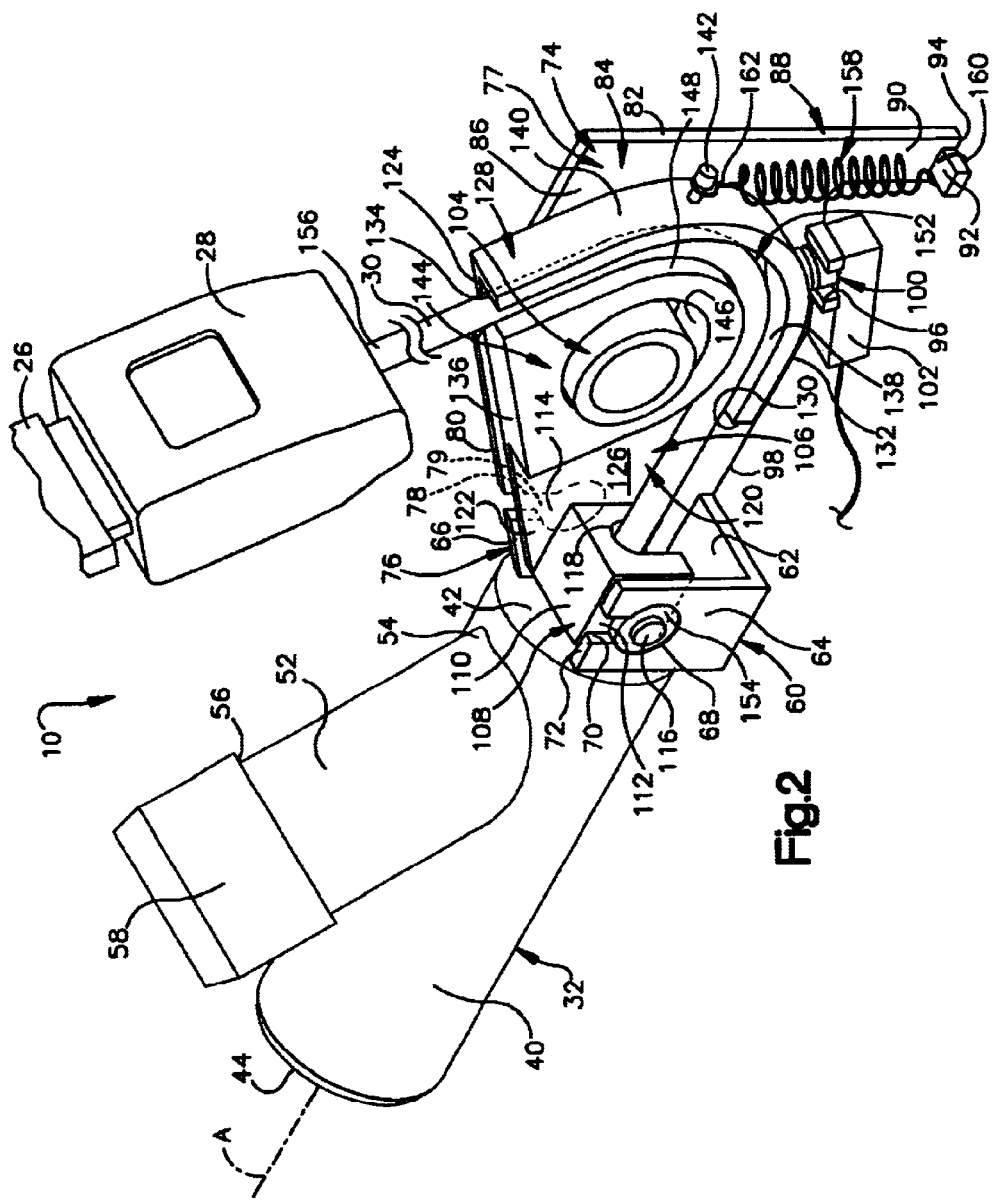
FIG. 2 is a perspective view of the apparatus of FIG. 1.

The pretensioner 32 may be any known type of pretensioner 32. Preferably, the pretensioner 32 includes a first cylinder 40, as is shown in FIG. 2. The first cylinder 40 extends along axis A and includes a first end 42 and a second end 44. A piston 46 (FIGS. 3 and 4) is centrally located within the first cylinder 40. A first end 48 of the anchor cable 30 is attached to the piston 46. The first end 42 of the first cylinder 40 includes an opening 50 through which the anchor cable 30 passes.

A second cylinder 52 intersects the first cylinder 40 near the first end 42 of the first cylinder. The second cylinder 52 also includes a first end 54 and a second end 56. The second end 56 of the second cylinder 52 includes external threads (not shown) for receiving a cap 58 having internal threads (not shown). A pyrotechnic charge (not shown) is located in the first end 54 of the second cylinder 52 and is positioned relative to the piston 46 such that when actuated, the pyrotechnic charge forces the piston toward the second end 44 of the first cylinder 40. A squib (not shown) is located in the second end 56 of the second cylinder 52 for igniting the pyrotechnic charge. A lead wire, shown schematically in FIG. 1 at 34, extends through the cap 53 on the second end 56 of the second cylinder 52 for connecting the squib to the controller 36.

The pretensioner 32 also includes a support member 60. The support member 60 extends axially outwardly from the first end 42 of the first cylinder 40. As shown in FIG. 2, the support member 60 includes a base wall 62 and first and second side walls 64 and 66 that extend perpendicularly upwardly from the base wall 62. The first side wall 64 includes a circular opening 68. A channel 70 having a width that is less than the diameter of the opening 68 extends from an upper surface 72 of the first side wall 64 into the first side wall 64 and intersects the opening 68.

Figure 3:
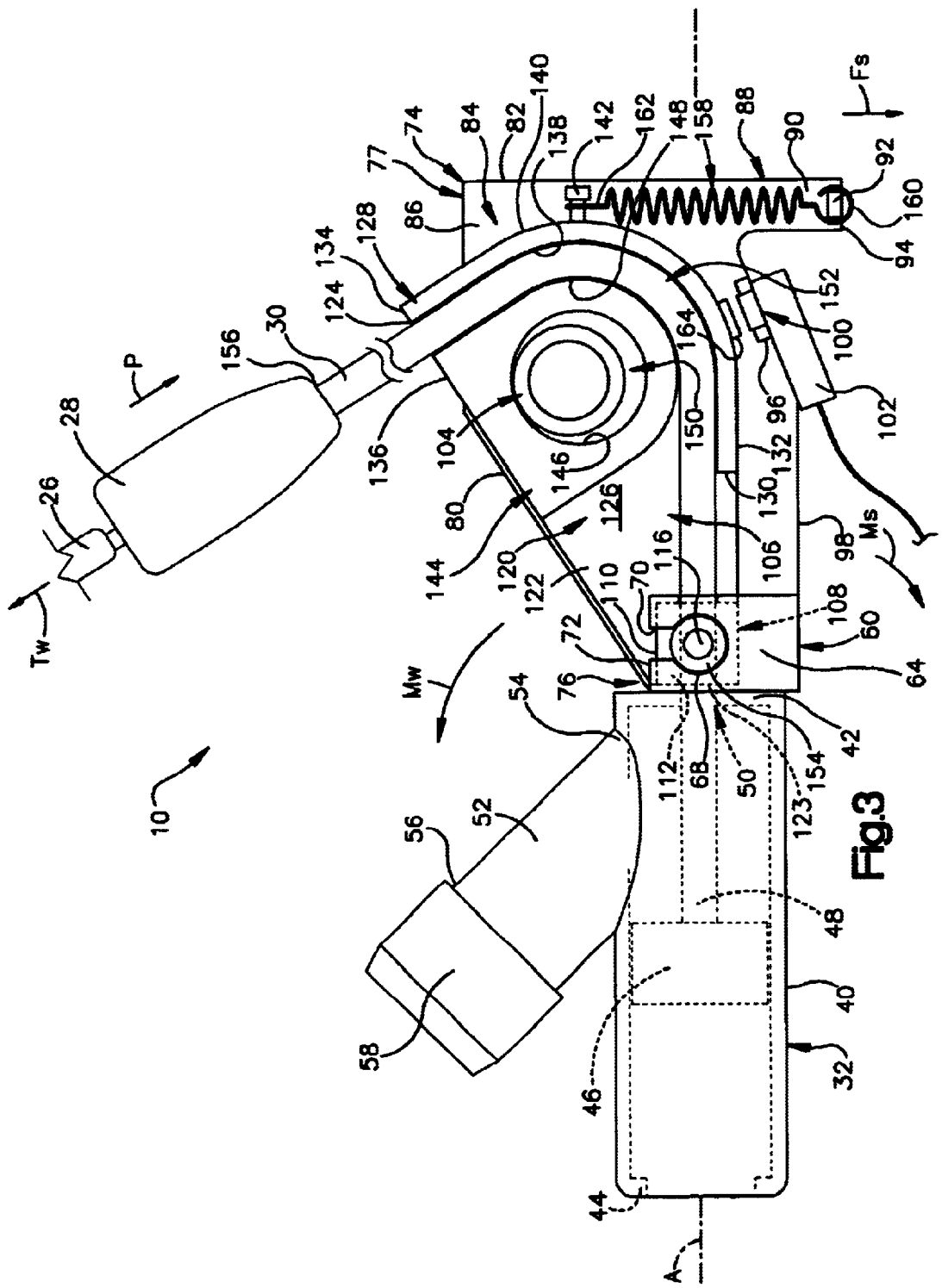
FIG. 3 is an elevation view of the apparatus of FIG. 2 illustrating a cable holder of the apparatus in an initial position.

The second side wall 66 (FIG. 2) of the support member 60 is provided by a guide wall 74 that is substantially larger than the first side wall 64. As best seen in FIG. 3, the guide wall 74 has a generally flat main body portion 84 that becomes wider or taller as it extends axially away from the first cylinder 40. The main body portion 84 of the guide wall 74 extends along axis A between a narrow end edge (not shown), which connects the guide wall 74 to the first end 42 of the first cylinder 40, and a wide end edge 82. The axial length of the guide wall 74 is approximately equal to the axial length of the first cylinder 40. The guide wall 74 also includes a narrow end 76 adjacent the narrow end edge and a wide end 77 adjacent the wide end edge 82 of the guide wall 74. A first side surface 86 of the guide wall 74 is located nearest the first side wall 64 of the support member 60. A second side surface (not shown) of the guide wall 74 is located opposite the first side surface 86.

A circular opening 79 (FIG. 2) extends through the narrow end 76 of the guide wall 74. The opening 79 in the narrow end 76 of the guide wall 74 aligns with the opening 68 on the first side wall 64 of the support member 60. A channel 78 having a width that is less than the diameter of the opening 79 extends from an upper edge 80 of the second side wall 66 into the narrow end 76 of the guide wall 74 and intersects the opening 79 in the guide wall 74.

An extension 88 extends downwardly from the wide end 77 of the guide wall 74 in the plane of the guide wall 74. The extension 88 includes a first side surface 90 and an opposite second side surface (not shown). A first protrusion 92, located on a lower end 94 of the first extension 88, extends outwardly from the first side surface 90 in a direction generally parallel to the base wall 62 of the support member 60.

A second protrusion 96 extends outwardly from the first side surface 86 of the main body portion 84 of the guide wall 74 near a lower edge 98 of the guide wall 74. A slot 100 extends through the second protrusion 96. The slot 100 extends in a direction perpendicular to axis A and provides a means for attaching a sensor 102 to the second protrusion 96.

A cylindrical protrusion 104 also extends outwardly of the first side surface 86 of the guide wall 74 from a central portion of the guide wall 74. The cylindrical protrusion 104 extends outwardly approximately one-half the distance between the first side wall 64 and the second side wall 66 of the support member 60. As will be discussed in greater detail below, the cylindrical protrusion 104 acts as an overtravel stop for limiting movement of a movable arm or cable holder 106 beyond a predetermined amount.

The movable arm or cable holder 106 includes a main body portion 120 that widens from a narrow end 122 to a wide end 124. The main body portion 120 of the cable holder 106 has an axial length, defined as a distance along axis A between a narrow end edge 123 and a wide end edge 140, that is less than the axial length of the guide wall 74. The main body portion 120 of the cable holder 106 includes a first side surface 126 and a second side surface (not shown), opposite the first side surface.

The cable holder 106 also includes a pivot member 108 for pivotally attaching the cable holder 106 to the support member 60 of the pretensioner 32. The pivot member 108 includes a top wall 110, a first side wall 112, and a second side wall 114 (FIG. 2). A short shaft of a pivot 116 extends outwardly of the first side wall 112 in a direction opposite to the second side wall 114 of the pivot member 108. The top wall 110 of the pivot member 108 connects the first side wall 112 to the second side wall 114. An arched channel 118 is formed between the first and second side walls 112 and 114 and below the top wall 110. The arched channel 118 provides access for the anchor cable 30 through the pivot member 108 and into the first cylinder 40 of the pretensioner 32.

The narrow end 122 of a main body portion 120 of the cable holder 106 forms the second side wall 114 of the pivot member 108. A short shaft (not shown) of the pivot 116 extends outwardly of the second side wall 114 of the pivot member 108 in a direction opposite to the first side wall 112.

An outer lip 128 extends outwardly from the first side surface 126 of the main body portion 120 of the cable holder 106. A first end 130 of the outer lip 128 is located adjacent a lower edge 132 of the main body portion 120 of the cable holder 106 approximately one-half the distance between the wide end 124 and the narrow end 122 of the cable holder. The outer lip 128 curves from the first end 130 along an edge of the wide end 124 of the cable holder 106 and terminates at a second end 134. The second end 134 is located at the intersection of an upper edge 136 of the main body portion 120 and the wide end 124.

The outer lip 128 includes an inner surface 138 and an outer surface 140. A protrusion 142 extends outwardly from the outer surface 140 of the outer lip 128 in a direction parallel to axis A. The protrusion 142 is centered vertically between the upper edge 136 and the lower edge 132 of the main body portion 120.

A guide 144 extends outwardly from the first side surface 126 of the main body portion 120 of the cable holder 106. The guide 144 includes a cylindrical inner surface 146 and a curved outer surface 148. The cylindrical inner surface 146 of the guide 144 defines an opening 150 (FIGS. 3 and 4) that extends completely through the main body portion 120 of the cable holder 106. The opening 150 has a diameter that is larger than the diameter of the cylindrical protrusion 104 from the guide wall 74 of the pretensioner 32. A portion of the curved outer surface 148 of the guide 144 extends parallel to the outer lip 128 on the wide end 124 of the cable holder 106.

A channel 152 is formed in the cable holder 106 between the inner surface 138 of the outer lip 128 and the outer surface 148 of the guide 144. The channel 152 receives the anchor cable 30, which is supported and guided through the cable holder 106 to the pretensioner 32 by surfaces 138 and 148.

To attach the cable holder 106 to the pretensioner 32, the cable holder 106 is aligned with the guide wall 74 of the pretensioner 32 such that the first end 130 of the outer lip 128 of the cable holder 106 is adjacent the second protrusion 96 of the guide wall 74. The second end 134 of the outer lip 128 of the cable holder 106 extends in a direction opposite the first extension 88 of the guide wall 74. The cylindrical protrusion 104 of the guide wall 74 is inserted into the opening 150 in the cable holder 106. The pivot member 108 of the cable holder 106 is then moved toward the support member 60 of the pretensioner 32. When the pivot 116 is aligned with the channels 70 and 78 leading to the openings 68 and 79 in the side walls 64 and 66 of the support member 60, the pivot member 108 is moved toward the base wall 62 of the support member 60. As a result, the pivot 116 passes through the channels 70 and 78 and into the openings 68 and 79 in the side walls 64 and 66 of the support member 60. A bushing 154, only one of which is shown, is then placed in each opening 68 and 79 for supporting the pivot 116 on side walls 64 and 66 and retaining the cable holder 106 on the support member 60.

When the pivot member 108 of the cable holder 106 is attached to the support member 60 of the pretensioner 32, the anchor cable 30, which is attached to the piston 46 within the first cylinder 40 of the pretensioner 32, passes through the arched channel 118 formed in the pivot member 108. The anchor cable 30 is then threaded through the channel 152 formed in the cable holder 106. A second end 156 of the anchor cable 30, opposite the end 48 secured to the piston 46, is attached to the buckle assembly 28 in a known manner.

A helical spring 158 is then attached between the pretensioner 32 and the cable holder 106. A first end 160 of the spring 158 is attached to the protrusion 92 on the first extension 88 of the pretensioner guide wall 74. A second end 162 of the spring 158 is attached to the protrusion 142 extending outwardly of the outer lip 128 of the cable holder 106.

Figure 4:
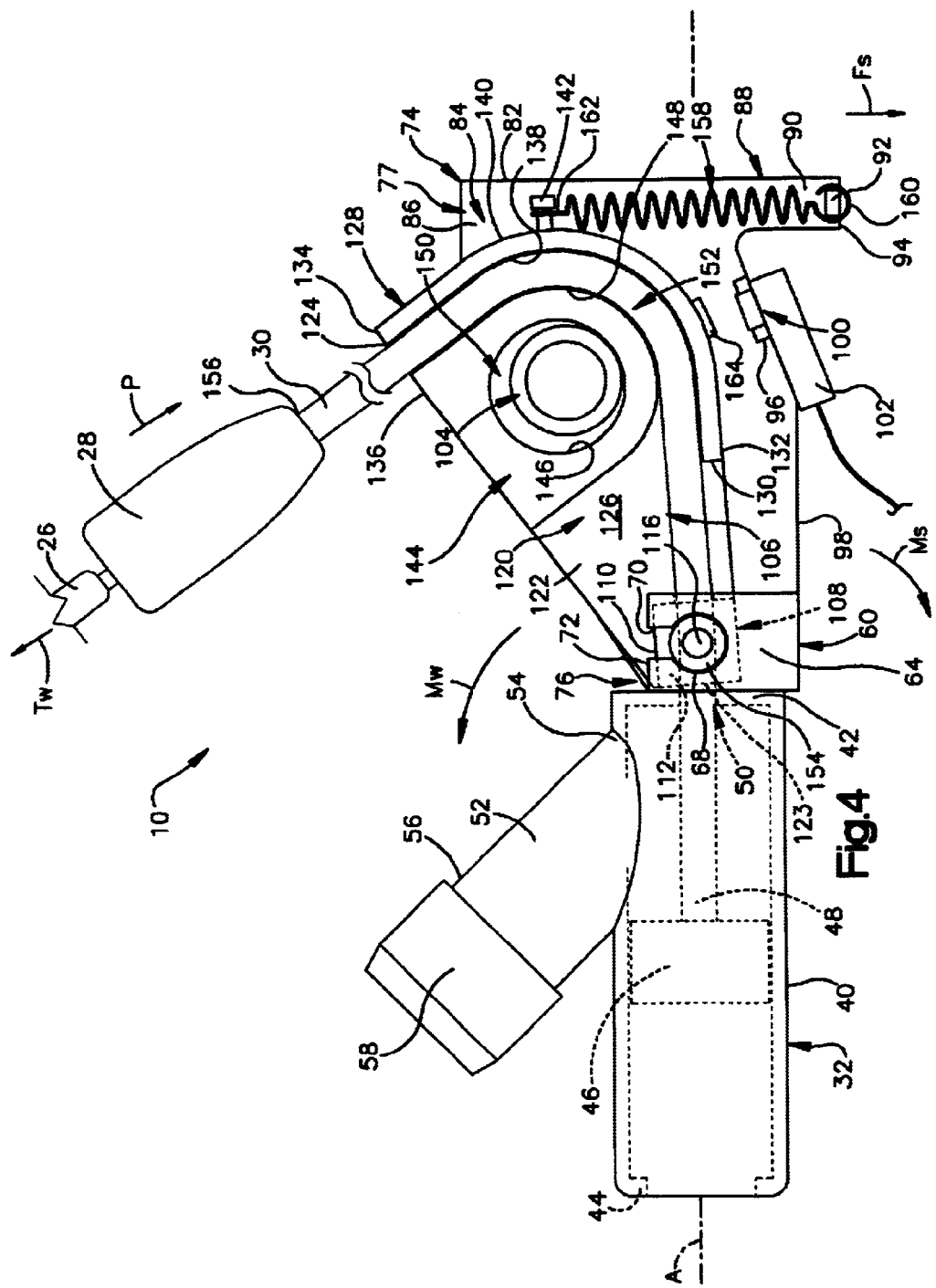
FIG. 4 is an elevation view of the apparatus of FIG. 2 illustrating a cable holder pivoted away from an initial position.

The spring 158 applies a force on the protrusion 142 of the cable holder 106 that tends pull the cable holder toward the protrusion 92 on the first extension 88. The force of the spring is indicated in FIGS. 3 and 4 at $F_s$. The spring force $F_s$ creates a moment, indicated at $M_s$, that tends to rotate the cable holder 106 in a clockwise direction, as viewed in FIGS. 3 and 4, about pivot 116. As a result, the spring 158 biases the cable holder 106 into an initial position. As shown in FIG. 3, when the cable holder 106 is in the initial position, the cylindrical protrusion 104 of the guide wall 74 contacts an upper portion of the cylindrical inner surface 146 of the guide 144 of the cable holder 106 and prevents clockwise rotation of the cable holder about pivot 116.

When the tongue 26 of the seat belt webbing 24 is fastened in the buckle assembly 28, tension in the seat belt webbing 24 pulls the buckle assembly 28 in the direction indicated by arrow $T_w$ in FIGS. 3 and 4. As a result, a force in the direction $T_w$ pulls on the second end 156 of the anchor cable 30 and tensions the anchor cable. Tension in the anchor cable 30 results in the anchor cable pulling upwardly, in the direction $T_w$, on the cable holder 106 with a force equivalent to the tension in the anchor cable. As a result, a moment, indicated at $M_w$ in FIGS. 3 and 4, is created that tends to rotate the cable holder 106 in a counterclockwise direction as viewed in FIGS. 3 and 4. The moment $M_w$ is approximately equal to the force applied on the cable holder 106 by the anchor cable 30 multiplied by a distance between pivot 116 and the portion of the anchor cable extending in the direction $T_w$. As is illustrated in FIGS. 3 and 4, the pivot member 108 of the cable holder 106 and the portion of the guide 144 of the cable holder that extends in the direction $T_w$ are spaced apart from one another by a distance that is at least half of the axial length of the cable holder.

As shown in FIG. 4, the cable holder 106 may be pivoted relative to the pretensioner 32 by a predetermined amount. Pivotal movement of the cable holder 106 relative to the pretensioner 32 is about the pivot 116. The predetermined amount of pivotal movement of the cable holder 106 relative to the pretensioner 32 is an amount between the initial position and a stop position. As shown in FIG. 4, in the stop position, the cylindrical protrusion 104 of the guide wall 74 contacts a lower portion of the cylindrical inner surface 146 of the guide 144 of the cable holder 106 and further pivoting of the cable holder 106 about the pivot 116 in the counterclockwise direction is prevented.

When moment $M_w$ exceeds moment $M_s$, the cable holder 106 pivots in the counterclockwise direction about pivot 116 and away from the initial position. As the cable holder 106 moves away from the initial position, the spring 158 is stretched and the spring force $F_s$ is increased. As a result, moment $M_s$ increases. The cable holder 106 pivots away from the initial position until moment $M_s$ equals moment $M_w$.

At a threshold tension in the anchor cable 30, the cable holder 106 will have pivoted away from the initial position by the predetermined amount. Further pivoting away from the initial position will be prevented by the cylindrical inner surface 146 of the guide 144 of the cable holder 106 contacting the cylindrical protrusion 104 of the guide wall 74. Any tension in the anchor cable 30 above the threshold tension will not result in movement of the cable holder 106 relative to the pretensioner 32.

When the cable holder 106 is away from the initial position and the tension in the anchor cable 30 decreases below the threshold tension, the cable holder pivots in the clockwise direction toward the initial position until moment $M_s$ equals moment $M_w$. If moment $M_s$ is greater than moment $M_w$, the cable holder 106 will be returned to the initial position and further rotation in the clockwise direction will be prevented.

A sensor 102 is mounted on the second protrusion 96 of the guide wall 74 for monitoring the movement of the cable holder 106 relative to the guide wall 74 of the pretensioner 32. The position of the sensor 102 is adjustable in the slot 100. Preferably, the sensor 102 is a magnetic position sensor, such as a Hall effect device. When a Hall effect device is used, a magnet 164 (FIGS. 3 and 4) is secured to the outer surface 140 of the outer lip 128 of the cable holder 106 in a position adjacent the sensor 102. The magnetic flux sensed by the sensor 102 decreases as the cable holder 106 pivots away from the initial position. As shown schematically in FIG. 1 at 166, the sensor 102 provides an output signal to the controller 36 that is indicative of the position of the cable holder 106 relative to the pretensioner 32.

In the event that the pretensioner 32 is actuated, ignition of the pyrotechnic charge forces the piston 46 toward the second end 44 of the first cylinder 40 of the pretensioner. The piston 46 moves a distance, parallel to axis A, as a result of the actuation. Since the first end 48 of the anchor cable 30 is attached to the piston 46, the anchor cable also moves the same distance as the piston. The buckle assembly 28 is attached to the second end 156 of the anchor cable 30. Movement of the anchor cable 30 effects movement of the buckle assembly 28 in a direction indicated at P in FIGS. 3 and 4. Since the anchor cable 30 has a constant length between its first and second ends 48 and 156, the buckle assembly 28 moves in the direction P a distance equal to the distance that the piston 46 moves along axis A. When the buckle assembly 28 is moved in the direction P, tension in the seat belt webbing 24 is increased.

The apparatus 10 of the present invention may be fixed either to the vehicle 16 or to the seat 12. Preferably, as shown in FIG. 1, the pretensioner 32 is fixed to the floor 38 of the vehicle 16 and the anchor line 30 extends between the buckle assembly 28 and the pretensioner 32. Alternatively, the pretensioner 32 may be fixed to the seat 12 or to another portion of the vehicle, such as a pillar. As an alternative to the anchor line 30 attaching to the buckle assembly 28, the anchor line 30 may be attached to a D-ring (not shown), a retractor (not shown), or an end (not shown) of the seat belt webbing 24.

The controller 36 includes a look-up table that includes data correlating the output signal from the sensor 102 to tension in the seat belt webbing 24. From the output signal of the sensor 102, the controller 36 can determine tension in the seat belt webbing 24 ranging from the tension required to move the cable holder 106 away from the initial position to the threshold tension. Those skilled in the art will recognize that the threshold tension and the tension required to move the cable holder 106 away from the initial position are both functions of the spring constant of the spring 158 and may be adjusted by replacing the spring 158 with a spring having the desired properties.

With reference again to FIG. 1, a weight sensor 168 is associated with the seat 12 for sensing the weight of an occupant of the seat 12. The weight sensor 168 may be any known weight sensor. The weight sensor 168 illustrated in FIG. 1 is located in the cushion portion 18 of the seat 12. As shown at 170 in FIG. 1, the weight sensor 168 is electrically connected to the controller 36. The weight sensor 168 provides an electrical signal to the controller 36 indicating the load acting downwardly on the seat cushion 18.

The vehicle 16 also includes a crash sensor 172. The crash sensor 172 is a known device that senses a vehicle condition indicating the occurrence of a crash. Such a condition may comprise, for example, vehicle deceleration. The crash sensor 172 is electrically connected to the controller, as shown at 174. Upon the occurrence of a crash condition, the crash sensor 172 sends a signal to the controller 36.

The vehicle 16 also includes an air bag module 176. The air bag module 176 is secured in the instrument panel 178 of the vehicle 16 and is actuatable for helping to protect the occupant of the vehicle 16. The air bag module 176 includes a reaction can 180, an inflator 182, and an air bag 184. The air bag module 176 may be of any known design.

As shown at 186, the air bag module 176 is electrically connected to the controller 36. The air bag module 176 is actuatable by the controller 36. When the controller 36 determines that actuation of the air bag module 176 is desirable, the controller 36 sends an actuation signal to a squib 188 in the inflator 182. Upon receiving the actuation signal, the squib 188 ignites, causing gas from the inflator 182 to flow into the air bag 184. The air bag 184, upon receiving gas from the inflator 182, expands through an opening in the instrument panel 178 and rearward into the passenger compartment 14 of the vehicle 16. Solid lines in FIG. 1 show the air bag 184 in a deflated condition. Dashed lines in FIG. 1 show the air bag 184 in an inflated condition.

When determining whether or not to actuate the air bag 184 and the pretensioner 32, one factor considered by the controller 36 is the weight of the occupant. Since the controller 36 receives a signal indicative of the weight of the occupant from the weight sensor 168 and a signal indicative of the tension in the seat belt webbing 24 from sensor 102, the controller 36 can determine the "true" weight of the occupant on the seat 12. To determine the "true" weight of the occupant of the seat 12, the controller 36 subtracts the load on the seat 12 resulting from tension in the seat belt webbing 24 from the weight measurement from the weight sensor 168.

Figure 5:
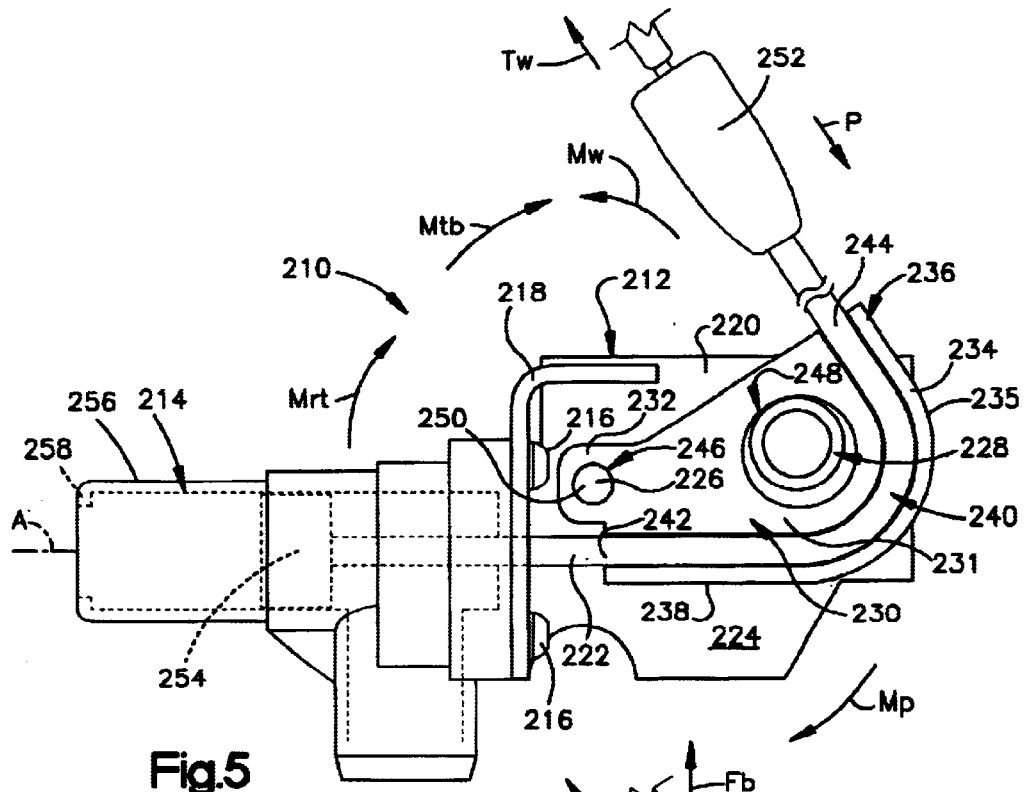
FIG. 5 is an elevation view of a second embodiment of the apparatus of the present invention.

A second embodiment of an apparatus 210 constructed in accordance with the present invention is shown in FIG. 5. Unlike the guide wall 74 and the pretensioner 32 of FIGS. 2–4, which are formed as one piece, the guide wall 212 and the pretensioner 214 in FIG. 5 are separate parts that are attached together using fasteners 216. The guide wall 212 includes a fastening portion 218 and a guiding portion 220. The fastening portion 218 extends perpendicular to the longitudinal axis A of the pretensioner 214 and includes a central opening (not shown) through which the anchor cable 222 passes. Two fastener openings (not shown), one above and one below the central opening, extend through the fastening portion 218 for receiving fasteners 216 to attach the guide wall 212 to the pretensioner 214.

The guiding portion 220 of the guide wall 212 extends perpendicular to and outwardly from the fastening portion 218 in a direction parallel to the longitudinal axis of the pretensioner. The guiding portion 220 includes a first side surface 224 and a second side surface (not shown). The first side surface 224 of the guiding portion 220 is nearest the fastening portion 218 of the guide wall 212. An opening (not shown) extends through the guiding portion 220 of the guide wall 212 near the fastening portion 218 for receiving a portion of a torsion bar 226. The guiding portion 220 also includes a cylindrical protrusion 228 that is located outwardly along axis A and a short distance above, as viewed in FIG. 5, the opening. The cylindrical protrusion 228 extends outwardly of the first side surface 224 a distance of approximately one-half the width, into the plane of the paper as viewed in FIG. 5, of the fastening portion 218 of the guide wall 212.

The cable holder 230 shown in FIG. 5 includes a narrow end 232 and a wide end 234. Unlike the cable holder 106 of FIGS. 2–4, the cable holder 230 of FIG. 5 does not includes a guide 144 that extends outwardly of the main body portion of the cable holder. Instead, the cable holder 230 includes a bent portion 236. The bent portion 236 has a semi-circular cross section that first bends rearward, into the plane of the paper as viewed in FIG. 5, and then curves to extend forwardly and terminates in the same plane as a first surface 231 of the cable holder 230. The bent portion 236 extends along a lower edge 238 and a wide end edge 235 of the cable holder 230. An inner surface of the bent portion 236 defines a channel 240 for receiving the anchor cable 222.

The cable holder 230 has a first opening 246 located near the narrow end 232 of the cable holder 230 for receiving a portion of the torsion bar 226. The first opening 246 is located above a first end 242 of the channel 240, as viewed in FIG. 5. A second opening 248 is located outwardly along axis A and a short distance above, as viewed in FIG. 5, the first opening 246. The second opening 248 has a diameter that is larger than the diameter of the cylindrical protrusion 228 of the guide wall 212.

The torsion bar 226 connects the cable holder 230 to the guide wall 212. A first end (not shown) of the torsion bar 226 is received in the opening of the guide wall 212 and a second end 250 of the torsion bar 226 is received in the first opening 246 of the cable holder 230. The torsion bar 226 allows the cable holder 230 to pivot relative to the pretensioner 214 and the guide wall 212.

When the apparatus 210 is assembled, the second opening 248 in the cable holder 230 receives the cylindrical protrusion 228 of the guiding portion 220 of the guide wall 212. As described in detail with regard to the apparatus 10 illustrated in FIGS. 2–4, the cylindrical protrusion 228 and the surface that defines the second opening 248 form an overtravel stop for limiting the amount of pivotal movement of the cable holder 230 relative to the guide wall 212 to a predetermined amount. The anchor cable 222 is threaded through the channel 240 of the cable holder 230 and is attached to the buckle assembly 252. As discussed with regards to apparatus 10, the anchor cable 222 may alternatively be attached to a D-ring (not shown), a retractor (not shown), or an end (not shown) of the seat belt webbing 24.

The pretensioner 214 of the apparatus 210 is fixed to either the vehicle 16 or the seat 12. When the tongue 26 is fastened in the buckle assembly 252, tension in the seat belt webbing 24 pulls the buckle assembly 252 in the direction indicated by arrow $T_w$. As a result, a force in the direction $T_w$ pulls on the anchor cable 222 and tensions the anchor cable. Tension in the anchor cable 222 results in the anchor cable pulling upwardly, in the direction $T_w$, on the cable holder 230 with a force equivalent to the tension in the anchor cable. As a result, a moment indicated at $M_w$ is created that tends to rotate the cable holder 230 in the counterclockwise direction as viewed in FIG. 5. The moment $M_w$ is approximately equal to the force applied on the cable holder 230 by the anchor cable 222 multiplied by a distance between the torsion bar 226 and the portion of the anchor cable extending in the direction $T_w$. As is illustrated in FIG. 5, the first opening 246 of the cable holder 230 and the portion of the channel 240 of the bent portion 236 of the cable holder that extends in the direction $T_w$ are spaced apart from one another by a distance that is at least half of the axial length of the cable holder.

Another moment, indicated at $M_{tb}$, is a moment caused by torsion of the torsion bar 226. The value of moment $M_{tb}$ is a function of the spring constant of the torsion bar 226 and the angular rotation or torsion of the torsion bar.

Similar to the cable holder 106 illustrated in FIGS. 3 and 4, the cable holder 230 in FIG. 5 has an initial position where the cylindrical protrusion 228 of the guide wall 212 contacts an upper portion of the surface defining the second opening 248 in the cable holder 230 and prevents clockwise rotation of the cable holder about torsion bar 226. The cable holder 230 may pivoted relative to the pretensioner 214 by a predetermined amount. Pivotal movement of the cable holder 230 is about the torsion bar 226. The predetermined amount of pivotal movement of the cable holder 230 relative to the pretensioner 214 is in a counterclockwise direction between the initial position and a stop position. In the stop position, the cylindrical protrusion 228 of the guide wall 212 contacts a lower portion of the surface defining the second opening 248 in the cable holder 230 and further pivoting of the cable holder 230 about the torsion bar 226 in the counterclockwise direction is prevented.

When the moment $M_w$ exceeds moment $M_{tb}$, the cable holder 230 pivots in a counterclockwise direction about the torsion bar 226. As the cable holder 230 moves away from the initial position, the torsion bar 226 twists and moment $M_{tb}$ increases. The cable holder 230 pivots away from the initial position until the moment $M_w$ equals moment $M_{tb}$.

At a threshold tension in the anchor cable 222, the cable holder 230 will have pivoted away from the initial position by the predetermined amount and further pivoting away from the initial position will be prevented. The predetermined amount of pivotal movement of the cable holder 230 relative to the guide wall 212 is an amount that is well below the yield point of the torsion bar 226.

When the cable holder 230 is away from the initial position and the tension in the anchor cable 222 decreases below the threshold tension, the cable holder pivots in the clockwise direction toward the initial position until moment $M_w$ equals the moment $M_{tb}$. If moment $M_{tb}$ is greater than moment $M_w$, the cable holder 230 will be returned to the initial position and further rotation in the clockwise direction will be prevented.

In the event that the pretensioner 214 is actuated, ignition of the pyrotechnic charge forces the piston 254 toward the second end 258 of the first cylinder 256 of the pretensioner. The piston 254 moves a distance, parallel to axis A, as a result of the actuation. Movement of the anchor cable 222 effects movement of the buckle assembly 252 in a direction indicated at P in FIG. 5. Since the anchor cable 222 has a constant length, the buckle assembly 252 moves in the direction P a distance equal to the distance that the piston 254 moves along axis A. When the buckle assembly 252 is moved in the direction P, tension in the seat belt webbing 24 is increased.

The sensor (not shown) in FIG. 5 is preferably a torsion sensor that senses the torsion in the torsion bar 226 and that provides an output signal indicative of the torsion to the controller 36. The pivotal movement of the cable holder 230 relative to the guide wall 212 is a function of the properties of the torsion bar 226 and may be adjusted by changing the torsion bar 226.

Figure 6:
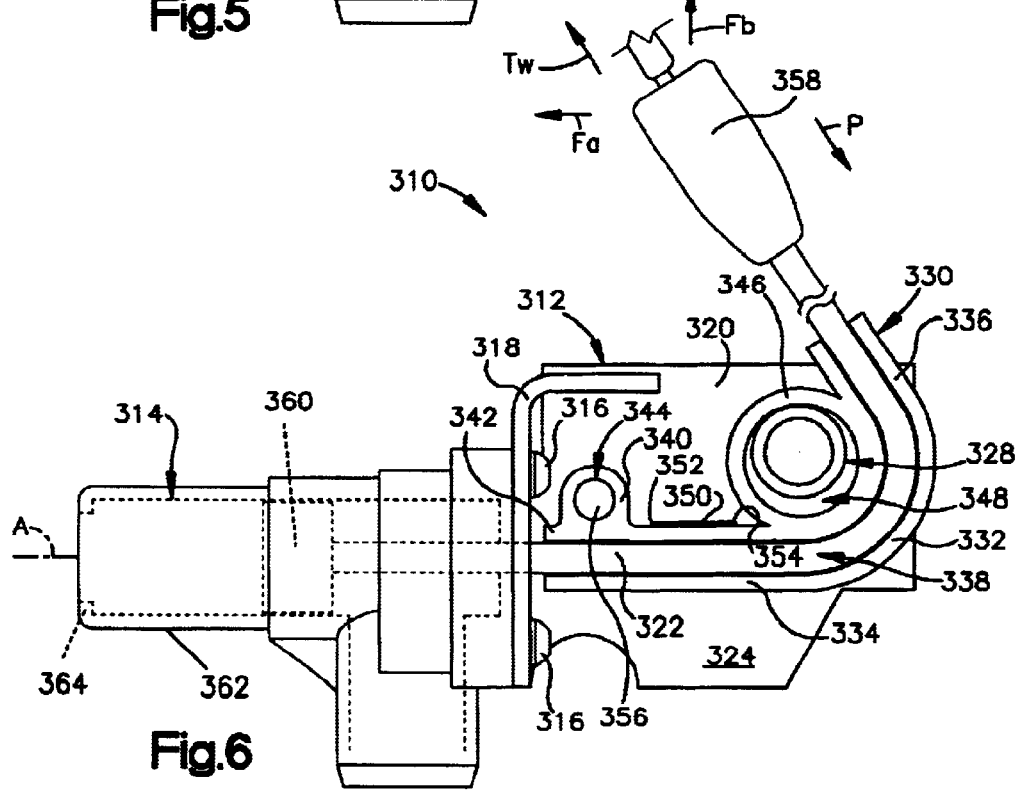
FIG. 6 is an elevation view of a third embodiment of the apparatus of the present invention.

FIG. 6 shows a third embodiment of an apparatus 310 constructed in accordance with the present invention. The general design of the guide wall 312 of FIG. 6 is similar to the design of the guide wall 212 in FIG. 5, and the structure of the guide wall 312 will be referenced with the same reference numbers as those in FIG. 5 except that 100 will be added to each number used in FIG. 5. The cable holder 330 of FIG. 6 includes an elongated main body portion 332. The main body portion 332 includes a portion 334 that extends along axis A and an angled portion 336. A channel 338 for receiving the anchor cable 322 extends through the main body portion 332 of the cable holder 330.

A first extension 340 extends upwardly from the axially extending portion 334 of the main body portion 332 near a first end 342 of the main body portion 332. A first opening 344 is located in the first extension. 340. A second extension 346 extends between the axially extending portion 334 and the angled portion 336 of the main body portion 332. The second extension 346 defines a second opening 348 for receiving the cylindrical protrusion 328 of the guide wall 312. The second opening 348 has a diameter that is greater than the diameter of the cylindrical protrusion 328.

A beam 350 extends partially along the axially extending portion 334 of the cable holder 330. The beam is preferably welded to the axially extending portion 334 of the cable holder 330. A first end 352 of the beam 350 is located adjacent the first opening 344 of the cable holder 330 and a second end 354 of the beam 350 is located adjacent the second opening 348 of the cable holder.

The pretensioner 314 of the apparatus 310 is fixed to either the vehicle 16 or the seat 12. The anchor cable 322 extends between a buckle assembly 358 and the pretensioner 314. As discussed with regards to apparatus 10, the anchor cable 322 may alternatively be attached to a D-ring (not shown), a retractor (not shown), or an end (not shown) of the seat belt webbing 24.

The cable holder 330 of FIG. 6 is fixed to the guide wall 312 using a fastener 356, as opposed to a torsion bar. When the tongue 26 of the seat belt webbing 24 is fastened in the buckle assembly 358, tension in the seat belt webbing 24 pulls the buckle assembly 358 in the direction indicated by arrow $T_w$ in FIG. 6. As a result, a force in the direction of $T_w$ pulls on the anchor cable 322 and tensions the anchor cable. Tension in the anchor cable 322 results in the anchor cable 322 pulling upwardly, in the direction $T_w$, on the cable holder 330 with a force equivalent to the tension in the anchor cable. The force in the direction $T_w$ may be broken into a force vector $F_a$ that is parallel to the axially extending portion 334 of the cable holder 330 and a force vector $F_b$ that is perpendicular to the axially extending portion 334 of the cable holder 330.

Since fastener 356 is rigid and does not twist when subjected to force vector $F_b$, force vector $F_b$ tends to bend an end of the axially extending portion 334 opposite the fastener 356 in an upward direction as viewed in FIG. 6. The axially extending portion 334 may bend a predetermined amount from an initial position where an upper portion of the cylindrical protrusion 328 of the guide wall 312 contact a surface defining the second opening 348 in the cable holder 330 to a stop position where a lower portion of the cylindrical protrusion 328 of the guide wall 312 contact a surface defining the second opening 348 in the cable holder. The axially extending portion 334 of the cable holder 330 will be in the stop position when a threshold tension, in the direction $T_w$, is applied to the anchor cable 322.

When the axially extending portion 334 of the cable holder 330 bends, the beam 350 is bent. The beam 350 bends in proportion to the axially extending portion 334 of the cable holder 330. As the tension of the seat belt webbing 24 decreases, the resiliency of the axially extending portion 334 of the cable holder 330 returns the cable holder to the initial position.

In the event that the pretensioner 314 is actuated, ignition of the pyrotechnic charge forces the piston 360 toward the second end 364 of the first cylinder 362 of the pretensioner. The piston 360 moves a distance, parallel to axis A, as a result of the actuation. Movement of the anchor cable 322 effects movement of the buckle assembly 358 in a direction indicated at P in FIG. 6. Since the anchor cable 322 has a constant length, the buckle assembly 358 moves in the direction P a distance equal to the distance that the piston 360 moves along axis A. When the buckle assembly 358 is moved in the direction P, tension in the seat belt webbing 24 is increased.

The sensor in FIG. 6 is a strain gauge that is mounted on the beam 350. FIG. 6 schematically illustrates the strain gauge at 380. Preferably, the strain gauge is a silicon-based or a resistive ink-based piezoresistive strain gauge. The strain gauge measures the strain of the beam 350 and provides an output signal indicative of the strain to the controller 36.

Figure 7:
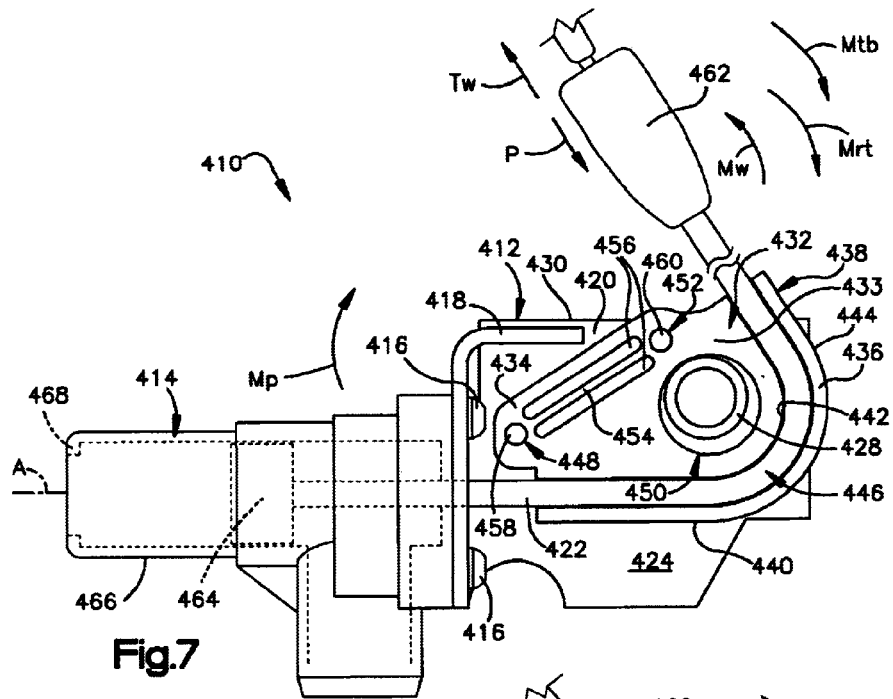
FIG. 7 is an elevation view of a fourth embodiment of the apparatus of the present invention illustrating a cable holder in an initial position.
Figure 8:
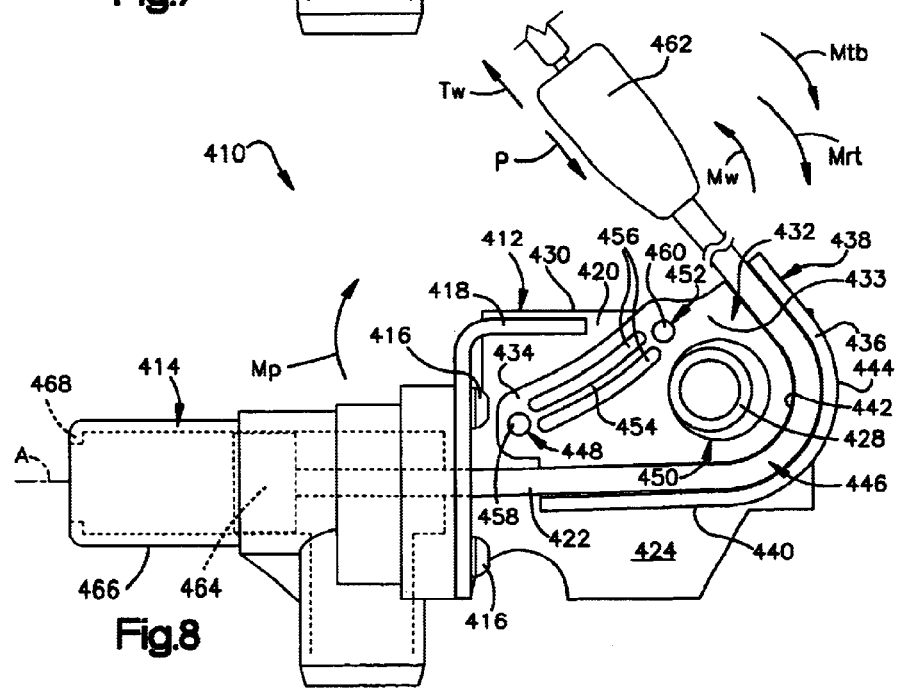
FIG. 8 is an elevation view of the embodiment of FIG. 7 illustrating a cable holder in a position away from the initial position.

A fourth embodiment of an apparatus 410 constructed in accordance with the present invention is shown in FIGS. 7–8. The guide wall 412 of FIGS. 7–8 is similar to the guide wall of FIGS. 5 and 6 with the addition of a third opening. Structures of the guide wall 412 in FIGS. 7–8 that are similar to structures of guide wall 312 in FIG. 6 will have the same reference number plus 100. The third opening (not shown) in guide wall 412 is located above the second opening and near an upper edge 430 of the guide wall 412.

The cable holder 432 of FIGS. 7–8 includes a narrow end 434 and a wide end 436. The cable holder also includes a bent portion 438 that first extends rearward, into the plane of the paper as viewed in FIGS. 7–8, and then curves forwardly and terminates in the same plane as a first surface 433 of the cable holder 432. The bent portion 438 has a semi-circular cross-section that includes an outer surface (not shown) and an inner surface 442. The inner surface 442 defines a channel 446 for receiving a portion of the anchor cable 422. The bent portion 438 extends along a lower edge 440 and a wide end edge 444 of the cable holder 432.

A first opening 448 is located near the narrow end 434 of the cable holder 432 above, as viewed in FIGS. 7–8, the lower edge 440 of the cable holder 432. A second opening 450 for receiving the cylindrical protrusion 428 of the guide wall 412 is located outwardly along axis A and a short distance above, as viewed in FIGS. 7–8, the first opening 448. The second opening 450 has a diameter that is greater than the diameter of the cylindrical protrusion 428. A third opening 452 is located above the second opening 450. Two parallel slots 456 extend from a point adjacent the first opening 448 to a point adjacent the third opening 452. The portion of the cable holder 432 between the slots 456 is effectively a beam 454. A fastener 458 is inserted into the first opening 448 of the cable holder 432 and the first opening of the guide wall 412. The fastener 458 connects the cable holder 432 to the guide wall 412. A torsion bar 460 is inserted into the third opening 452 of the cable holder 432 and the second opening of the guide wall 412. The torsion bar 460 also connects the cable holder 432 to the guide wall 412.

The pretensioner 414 of the apparatus 410 is fixed to either the vehicle 16 or the seat 12. The anchor cable 422 extends between the pretensioner 414 and a buckle assembly 462. The anchor cable 422 may alternatively be attached to a D-ring (not shown), a retractor (not shown), or an end (not shown) of the seat belt webbing 24.

When the tongue 26 of the seat belt webbing 24 is fastened in the buckle assembly 462, tension in the seat belt webbing 24 pulls the buckle assembly 462 in the direction indicated by arrow $T_w$ in FIGS. 7 and 8. As a result, a force in the direction of $T_w$ pulls on the anchor cable 422 and tensions the anchor cable. Tension in the anchor cable 422 results in the anchor cable 422 pulling upwardly, in the direction $T_w$, on the cable holder 432 with a force equivalent to the tension in the anchor cable. As a result, a moment indicated at $M_w$ is created that tends to rotate the cable holder 432 in the counterclockwise direction as viewed in FIGS. 7 and 8. The moment $M_w$ is approximately equal to the force applied on the cable holder 432 by the anchor cable 422 multiplied by a distance between the torsion bar 460 and the portion of the anchor cable extending in the direction $T_w$.

Another moment, indicated as $M_{tb}$, is a moment caused by torsion of the torsion bar 460. The value of moment $M_{tb}$ is a function of the spring constant of the torsion bar 460 and the angular rotation or torsion of the torsion bar.

When moment $M_w$ exceeds moment $M_{tb}$, the cable holder 432 attempts to pivot relative to the guide wall 412. Fastener 458 resists the pivoting movement, while torsion bar 460 allows the pivoting movement. As a result, the wide end 436 of the cable holder 432 begins to pivot about an axis centered at the torsion bar 460. Because the fastener 458 resists movement of the narrow end 434 of the cable holder 432, the pivotal movement of the wide end 436 of the cable holder 432 is movement relative to the narrow end 434 of the cable holder. The movement of the wide end 436 of the cable holder 432 relative to the narrow end 434 of the cable holder 432 causes the cable holder 432 to bend. The bend of the cable holder 432 is concentrated in an area between the fastener 458 and the torsion bar 460. As a result, the center of the beam 454 of the cable holder 432 bends, or buckles, as is shown in FIG. 8.

The movement of the cable holder 432 relative to the guide wall 412 is limited to a predetermined amount. When the cable holder 432 is in the initial position, shown in FIG. 7, an upper portion of the cylindrical protrusion 428 of the guide wall 412 contacts a surface defining the second opening 450. When subjected to a threshold tension, the wide end 436 of the cable holder 432 will be rotated about the torsion bar 460 by the predetermined amount, as shown in FIG. 8. When the cable holder 432 is rotated by the predetermined amount, a left side portion of the cylindrical protrusion 428 of the guide wall 412 contacts the surface defining the second opening 450 of the guide wall 412. As the tension on the seat belt webbing 24 decreases, the resiliency of the cable holder 432 returns the cable holder to the initial position.

In the event that the pretensioner 414 is actuated, ignition of the pyrotechnic charge forces the piston 464 toward the second end 468 of the first cylinder 466 of the pretensioner. The piston 464 moves a distance, parallel to axis A, as a result of the actuation. Movement of the anchor cable 422 effects movement of the buckle assembly 462 in a direction indicated at P in FIGS. 7 and 8. Since the anchor cable 422 has a constant length, the buckle assembly 462 moves in the direction P a distance equal to the distance that the piston 464 moves along axis A. When the buckle assembly 462 is moved in the direction P, tension in the seat belt webbing 24 is increased.

The sensor is located on the beam 454 of the cable holder 432. Preferably, the sensor is a strain gauge. FIGS. 7 and 8 schematically illustrate the strain gauge at 480. The sensor measures the strain on the beam 454 and provides an output signal to the controller 36. The controller 36 determines the tension in the seat belt webbing 24 from the output signal from the sensor. Alternatively, the sensor may be a torsion sensor located on the torsion bar 460.

Figure 9:
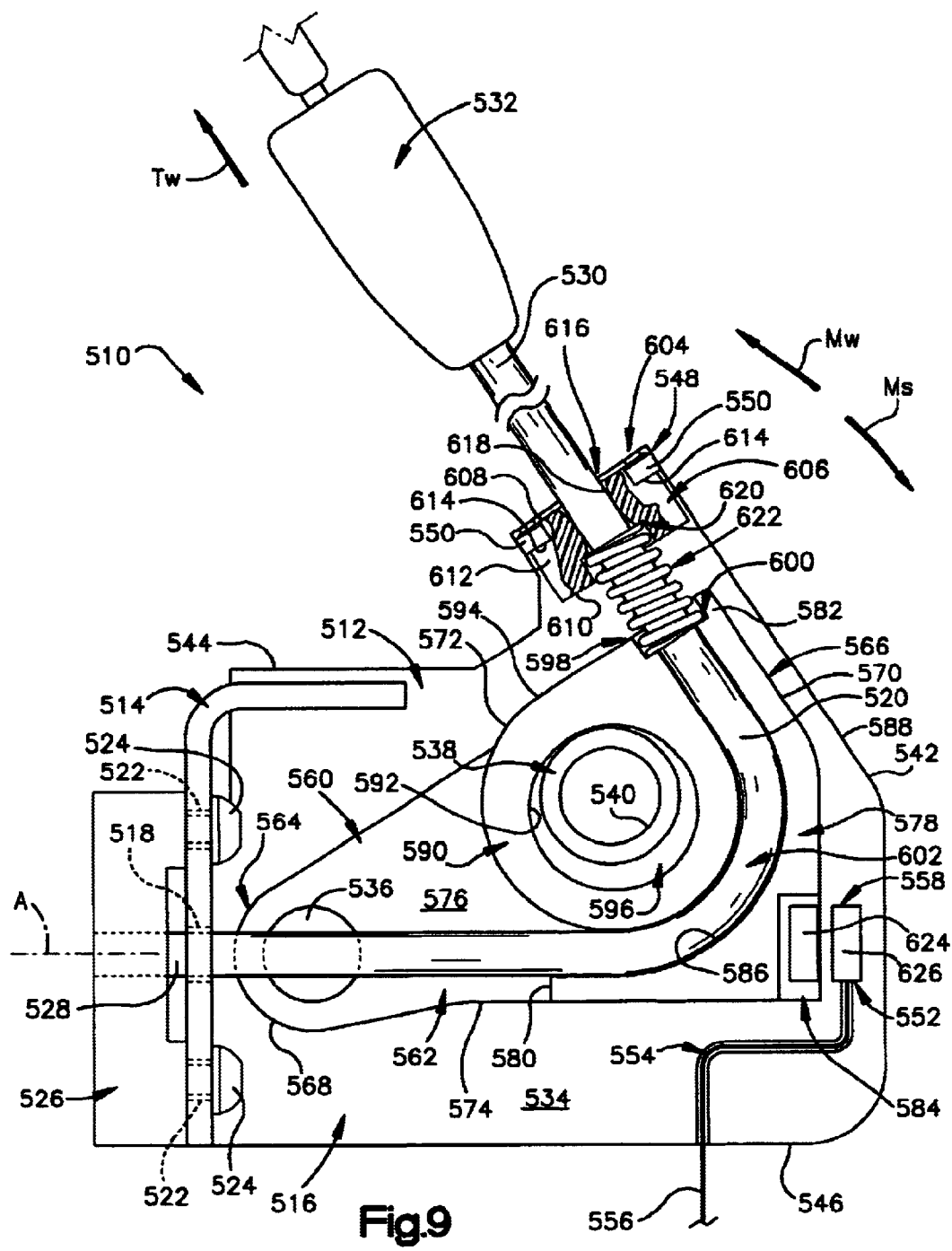
FIG. 9 is an elevation view of a fifth embodiment of the apparatus of the present invention illustrating a cable holder in an initial position.
Figure 10:
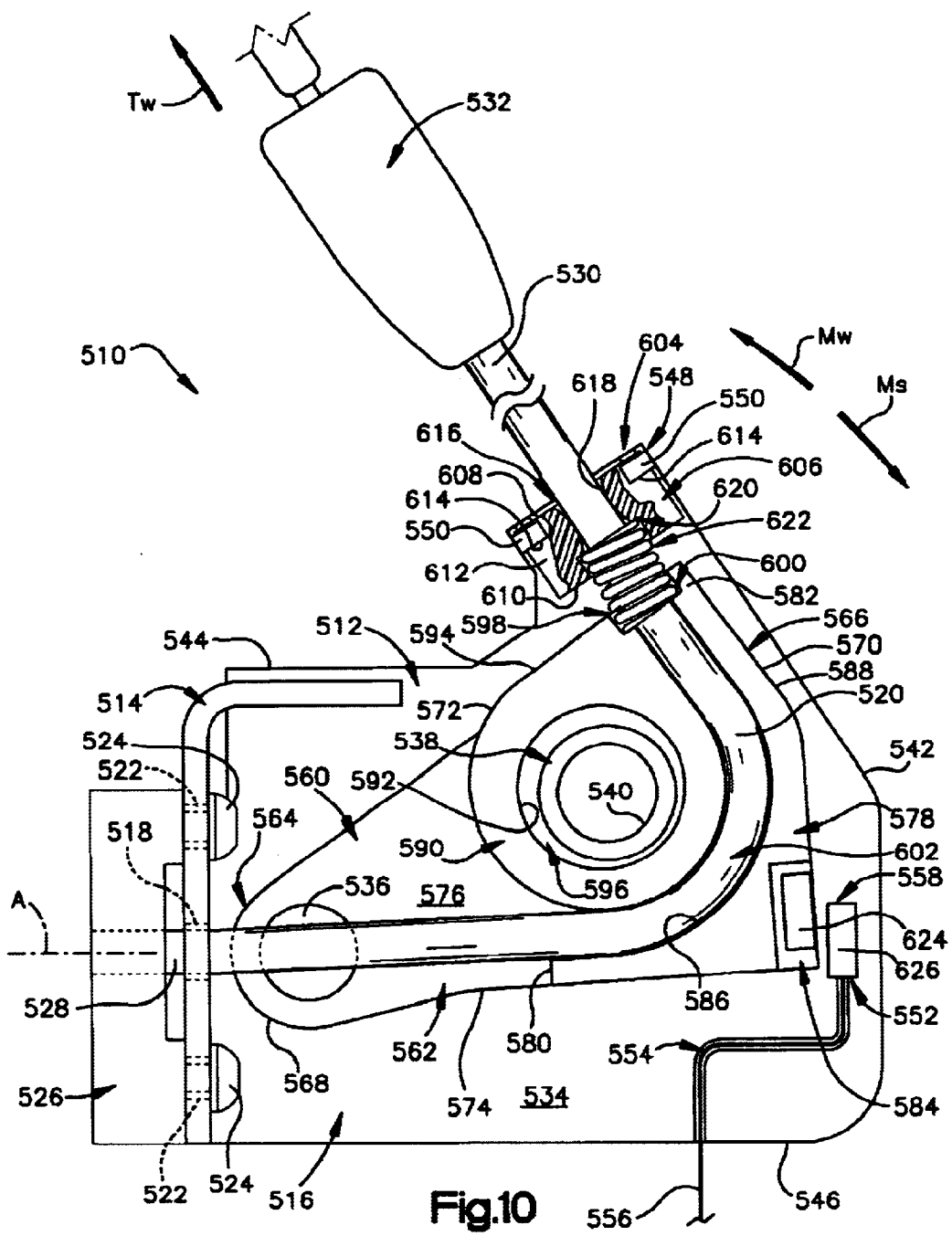
FIG. 10 is an elevation view of the embodiment of FIG. 9 illustrating the cable holder in a position away from the initial position.

A fifth embodiment of an apparatus 510 constructed in accordance with the present invention is shown in FIGS. 9 and 10. The guide wall 512 of FIGS. 9 and 10 includes a fastening portion 514 and a guiding portion 516. The fastening portion 514 extends perpendicular to the longitudinal axis A and includes a central opening 518 through which the anchor cable 520 passes. Two fastener openings 522, one above and one below the central opening 518, extend through the fastening portion 514 for receiving bolts 524 to attach the guide wall 512 to the an anchor plate 526.

The anchor plate 526 may be a portion of the vehicle 16, a portion of the seat 12, or a portion of a pretensioner as set forth above with reference to FIGS. 5–8. As shown in FIGS. 9 and 10, a first end 528 of the anchor cable 520 is fixed to the anchor plate 526. As will be discussed below, a second end 530 of the anchor cable 520 is attached to a portion of the seat belt assembly 22 (FIG. 1), preferably the buckle assembly 532.

The guiding portion 516 of the guide wall 512 extends perpendicular to and outwardly from the fastening portion 514 in a direction parallel to the longitudinal axis A. The guiding portion 516 includes a first side surface 534 and a second side surface (not shown). The first side surface 534 of the guiding portion 516 is nearest the fastening portion 514 of the guide wall 512. An opening (not shown) extends through the guiding portion 516 of the guide wall 512 near the fastening portion 514 for receiving a pivot pin 536 or rivet. The guiding portion 516 also includes a cylindrical protrusion 538 that is axially spaced away from, relative to axis A, and a short distance above, as viewed in FIGS. 9 and 10, the opening for the pivot pin 536. The cylindrical protrusion 538 extends outwardly from the first side surface 534 a distance of approximately one-half the width, into the plane of the paper as viewed in FIGS. 9 and 10, of the fastening portion 514 of the guide wall 512. A cylindrical inner surface 540 of the cylindrical protrusion 538 extends through the guide wall 512 to the second side surface of the guide wall. A mounting bolt (not shown) may be received through the cylindrical inner surface 540 of the cylindrical protrusion 538 for forming an additional attachment of the apparatus 510 to the anchor plate 526.

The guiding portion 516 of the guide wall 512 also includes a wide end edge 542, opposite the fastening portion 514, and upper and lower edges 544 and 546, respectively. A bushing holder 548 is located on the upper edge 544 of the guide wall 512 adjacent the wide end edge 542. The bushing holder 548 includes two outwardly extending fingers 550 that are separated by a slot. The fingers 550 extend outwardly from the first side surface 534 of the guide wall 512 a distance that is approximately equal to the outward extension of the cylindrical protrusion 538.

A sensor support 552 is formed on the guide wall 512 near the wide end edge 542 of the guide wall. The sensor support 552 includes a channel 554 for supporting lead wires 556 of a sensor 558.

The cable holder 560 includes a generally wedge shaped main body portion 562. The main body portion 562 widens from a narrow end 564 to a wide end 566. The cable holder 560 has an arcuate narrow end edge 568, a wide end edge 570, and upper and lower edges 572 and 574, respectively. The main body portion 562 of the cable holder 560 has an axial length, defined as a distance along axis A between the narrow end edge 568 and the wide end edge 570, that is less than the axial length of the guide wall 512. The main body portion 562 of the cable holder 560 also includes a first side surface 576 and a second side surface (not shown), opposite the first side surface.

The narrow end 564 of a main body portion 562 of the cable holder 560 includes a circular opening (not shown). A low friction bushing (not shown) may be received in the opening.

The main body portion 562 of the cable holder 560 also includes an outer lip 578. The outer lip 578 extends outwardly from the first side surface 576 of the main body portion 562 of the cable holder 560. A first end 580 of the outer lip 578 is located adjacent the lower edge 574 of the main body portion 562 of the cable holder 560 approximately one-half the distance between the wide end edge 570 and the narrow end edge 568 of the cable holder. The outer lip 578 also extends along the wide end edge 570 of the cable holder 560 and terminates in a notched portion 582 at the intersection of the upper edge 572 and the wide end edge 570. A gap 584 is formed in the outer lip 578 at the intersection of the lower edge 574 and the wide end edge 570 of the main body portion 562. The outer lip 578 includes an inner surface 586 and an outer surface 588.

A guide 590 extends outwardly from the first side surface 576 of the main body portion 562 of the cable holder 560. The guide 590 includes a cylindrical inner surface 592 and a curved outer surface 594. The cylindrical inner surface 592 of the guide 590 defines an opening 596 that extends completely through the main body portion 562 of the cable holder 560. The opening 596 has a diameter that is larger than the diameter of the cylindrical protrusion 538 of the guide wall 512. A portion of the outer surface 594 of the guide 590 extends parallel to inner surface 586 of the outer lip 578. A notched portion 598 of the guide 590 extends into the outer surface 594 of the guide and is located adjacent the notched portion 582 of the outer lip 578. Together, the notched portion 598 of the guide 590 and the notched portion 582 of the outer lip 578 form a spring seat 600.

A channel 602 for guiding a portion of the anchor cable 520 is defined in the cable holder 560 between the inner surface 586 of the outer lip 578 and the outer surface 588 of the guide 590. The channel 602 orients the anchor cable 520 such that the anchor cable extends from the anchor plate 526 and through the slot in the bushing holder 548 of the guide wall 512.

The apparatus 510 of FIGS. 9 and 10 also includes a cable guide 604. As will be discussed in detail below, the cable guide 604 reduces the occurrence of a variable moment acting on the cable holder 560. The cable guide 604 includes a bushing 606, shown in partial section. The bushing 606 is preferably made from a low friction material. In the embodiment of FIGS. 9 and 10, the bushing 606 is formed from plastic. The bushing 606 has a box-like shape that is defined by six outer surfaces. Upper and lower surfaces 608 and 610, respectively, of the bushing 606 are generally square. The four side surfaces, only one of which is shown at 612, of the bushing 606 are generally rectangular and have a height, measured between the upper and lower surfaces 608 and 610 of the bushing, of approximately one-half their width. Two notches 614 are formed in opposite side surfaces of the bushing 606. The two notches 614 extend parallel to one another.

A centrally located aperture 616 extends through the bushing 606 from the lower surface 610 to the upper surface 608. A surface 618 of the bushing 606 defining the aperture 616 has an arcuate shape with a narrow portion of the aperture located between the upper and lower surfaces 608 and 610 of the bushing 606. The arcuate surface 618 widens near the lower and upper surfaces 610 and 608 of the bushing 606. The diameter of the aperture 616, defined at the narrow portion of the aperture, is slightly larger than a diameter of the anchor cable 520. A surface surrounding an opening to the aperture 616 on the lower surface 610 of the bushing 606 defines a spring seat 620. The spring seat 620 may be located on the lower surface 610 of the bushing 606 or recessed slightly into the bushing 606 as shown in FIGS. 9 and 10.

To assembly the apparatus 510 of FIGS. 9 and 10, the anchor cable 520 is fixed to the anchor plate 526 in a known manner. The anchor cable 520 is passed through the opening 518 in the fastening portion 514 of the guide wall 512. The guide wall is fastened to the anchor plate 526 by inserting bolts 524 through the fastener openings 522 in the fastening portion 514 of guide wall and into the anchor plate. A mounting bolt may also be inserted through the cylindrical inner surface 540 of the cylindrical protrusion 538 to attach the guide wall 512 to the anchor plate 526.

To attach the cable holder 560 to the guide wall 512, the cable holder is aligned with the guide wall such that the cylindrical protrusion 538 of the guide wall is inserted into the opening 596 defined by the inner surface 592 of the guide 590 of the cable holder and the spring seat 600 of the cable holder is positioned near the bushing holder 548 of the guide wall. The opening for a pivot pin 536 of the cable holder 560 is then aligned with the opening for a pivot pin of the guide wall 512. A pivot pin 536 or rivet is extended through the openings to pivotally attach the cable holder 560 to the guide wall 512. When attached to the guide wall 512, the cable holder 560 is pivotal relative to the guide wall about the pivot pin 536.

The bushing 606 of the cable guide 604 is secured to the guide wall 512 by extending the fingers 550 of the bushing holder 548 into the notches 614 of the bushing. A spring 622 is inserted between the cable holder 560 and the bushing 606. In the embodiment shown in FIGS. 9 and 10, the spring 622 is a compression spring. An end of the spring 622 is placed in the spring seat 620 of the bushing 606 and the opposite end of the spring is placed in the spring seat 600 of the cable holder 560. The spring 622 creates a moment $M_s$ on the cable holder 560 to rotate the cable holder clockwise as viewed in FIGS. 9 and 10. Moment Ms is approximately equal to the force exerted by the spring multiplied by a distance between a center of the pivot pin 536 and a center of the spring seat 600 on the cable holder 560. The spring 622 rotates or biases the cable holder 560 into an initial position, shown in FIG. 9. When the cable holder 560 is in the initial position, the cylindrical protrusion 538 of the guide wall 512 contacts an upper portion of the cylindrical inner surface 592 of the guide 590 of the cable holder 560 and prevents clockwise rotation of the cable holder relative to the guide wall.

The anchor cable 520 is then threaded through the channel 602 of the cable holder 560, through the spring 622, and through the bushing 606. The second end 530 of the anchor cable 520 is attached to a portion of the seat belt assembly 22, preferably the seat belt buckle assembly 532, in a known manner. The anchor cable 520 may alternatively be attached to a D-ring (not shown), a retractor (not shown), or an end (not shown) of the seat belt webbing 24.

When a tongue associated with the seat belt webbing 24 is fastened in the buckle assembly 532, tension in the seat belt webbing 24 results in a force on the anchor cable 520 that is generally directed in the direction $T_w$. The force creates a tension in the anchor cable 520 and results in a force in the direction $T_w$ on the cable holder 560. As a result, a moment $M_w$ is created that tends to rotate the cable holder 560 in a counterclockwise direction as viewed in FIG. 9. The moment $M_w$ is approximately equal to the force applied on the cable holder 560 by the tension in the anchor cable 520 multiplied by a distance between the center of the pivot pin 536 and the center of the spring seat 600 on the cable holder 560 through which the anchor cable passes. As is illustrated in FIG. 9, the opening of the cable holder 560 that receives the pivot pin 536 and the portion of the channel 602 of the cable holder that extends in the direction $T_w$ are spaced apart from one another by a distance that is at least half of the axial length of the cable holder.

When moment $M_w$ exceeds moment $M_s$, the cable holder 560 pivots in the counterclockwise direction about the pivot pin 536 and away from the initial position. As the cable holder 560 moves away from the initial position, the spring 622 is compressed and the spring force increases. As a result, moment $M_s$ increases. The cable holder 560 pivots away from the initial position until moment $M_s$ equals moment $M_w$.

At a threshold tension in the anchor cable 520, the cable holder 560 will have pivoted away from the initial position by a predetermined amount, shown in FIG. 10. Further pivoting away from the initial position will be prevented by a lower portion of the cylindrical inner surface 592 of the guide 590 of the cable holder 560 contacting the cylindrical protrusion 538 of the guide wall 512. Thus, the cylindrical inner surface 592 of the guide 590 of the cable holder 560 and the cylindrical protrusion 538 of the guide wall 512 collectively form an overtravel stop to prevent rotation of the cable holder beyond the predetermined amount. Any tension in the anchor cable 520 above the threshold tension will not result in movement of the cable holder 560 relative to the guide wall 512. The overtravel stop resists increased tension beyond the threshold tension.

When the cable holder 560 is away from the initial position and the tension in the anchor cable 520 decreases below the threshold tension, the cable holder pivots in the clockwise direction toward the initial position until moment $M_s$ equals moment $M_w$. If moment $M_s$ is greater than moment $M_w$, the cable holder 560 will be returned to the initial position and further rotation in the clockwise direction will be prevented.

The cable guide 604 of the apparatus 510 of FIGS. 9 and 10 reduces a variable moment on the cable holder 560 that may result from off-axis loading of the seat belt webbing 24. Off-axis loading of the seat belt webbing 24 is defined as loading of the seat belt webbing in a direction other than in the direction of $T_w$ shown in FIGS. 9 and 10. For example, if the seat belt webbing and thus, the second end 530 of the anchor cable 520, is moved upward and rightward, as viewed in FIG. 9, the bushing 606 of the cable guide 604 redirects the anchor cable between the bushing and the channel 602 of the cable holder 560 to maintain the angle shown in FIG. 9. Thus, when the cable holder 560 is in the initial position, the anchor cable 520 is maintained at a predetermined angle between the cable holder and the bushing 606. Since the anchor cable 520 is maintained at the predetermined angle between the cable holder 560 and the bushing 606, the distance between the center of the pivot pin 536 and the location of the anchor cable tension will not vary as the second end 530 of the anchor cable 520 is moved IF off-axis. As a result, for a given force, any change in the moment $M_w$ that may result from movement of the second end 530 of the anchor cable 520 is reduced.

A sensor 558 monitors the movement of the cable holder 560 relative to the guide wall 512. The sensor 558 illustrated in FIGS. 9 and 10 includes a magnet 624 and a device 626 for measuring movement of the magnet. The magnet 624 is secured in the gap 584 formed in the outer lip 578 of the cable holder 560. The magnet 624 is preferably a two-pole magnet. The device 626 is secured in the cavity, adjacent the location of the magnet 624 on the cable holder 560. The device 626 is preferably a magnetic position sensor, such as a Hall effect device, for sensing the position of the magnet 624 relative to the device 626. Lead wires 556 of the sensor 558 extend through the channel 554 formed in the guide wall 512. The sensor 558 provides an output signal to the controller 36. The sensor 558 is designed so that movement of the cable holder 560 in response to changes in tension in the seat belt webbing 24 will not alter operation of the sensor 558 in returning to a reading of zero when tension in removed from the seat belt webbing.

Figure 11:
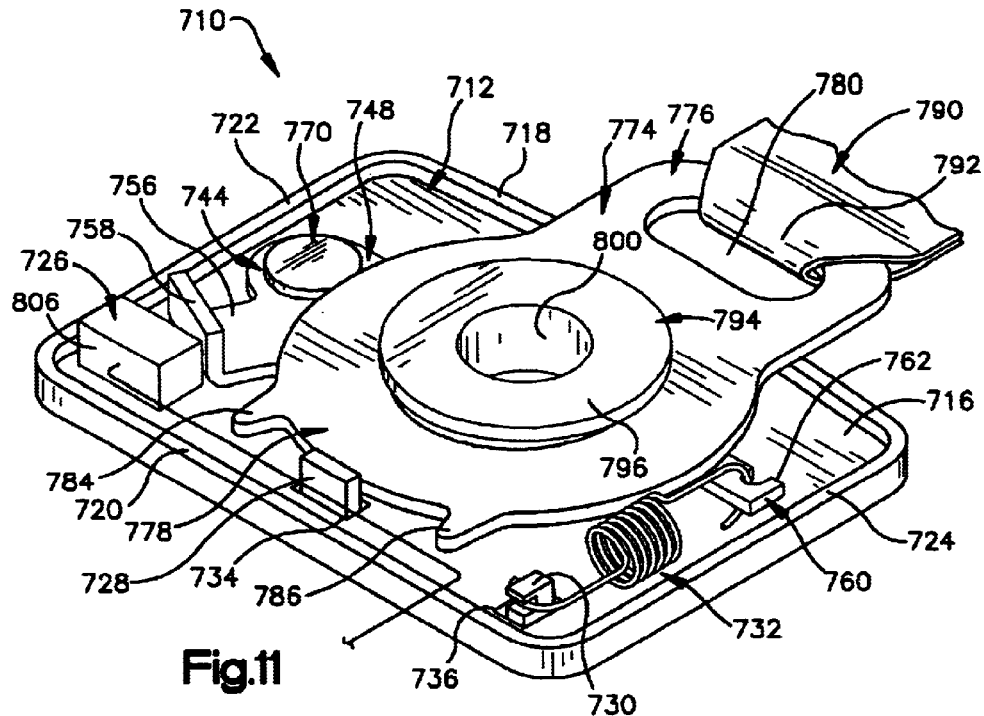
FIG. 11 is a perspective view of a sixth embodiment of the apparatus of the present invention.

FIGS. 11–17 illustrate a sixth embodiment of an apparatus 710 constructed in accordance with the present invention. As shown in FIG. 11, the apparatus 710 includes a generally rectangular guide wall 712. As shown in the exploded view of FIG. 13, the guide wall 712 is formed from a generally rectangular a steel backing plate 714 and a rectangular plastic cover plate 716.

The guide wall 712, and particularly the plastic cover plate 716, includes upper, lower, left, and right edges 718, 720, 722 and 724, respectively. A sensor clip (not shown) for supporting a sensor 726 is located in a corner defined by the lower and left edges 720 and 722. A steel pivot stop 728 extends outwardly of the guide wall 712 in a central location adjacent the lower edge 720. A hook 730 for supporting a portion of a spring 732 extends outwardly of the guide wall 712 in a corner adjacent the lower and right edges 720 and 724. The steel pivot stop 728 and the hook 730 are formed on the steel backing plate 714 and extend through corresponding openings 734 and 736 in the plastic cover plate 716 of the guide wall 712, as shown in FIG. 11.

Figure 13:
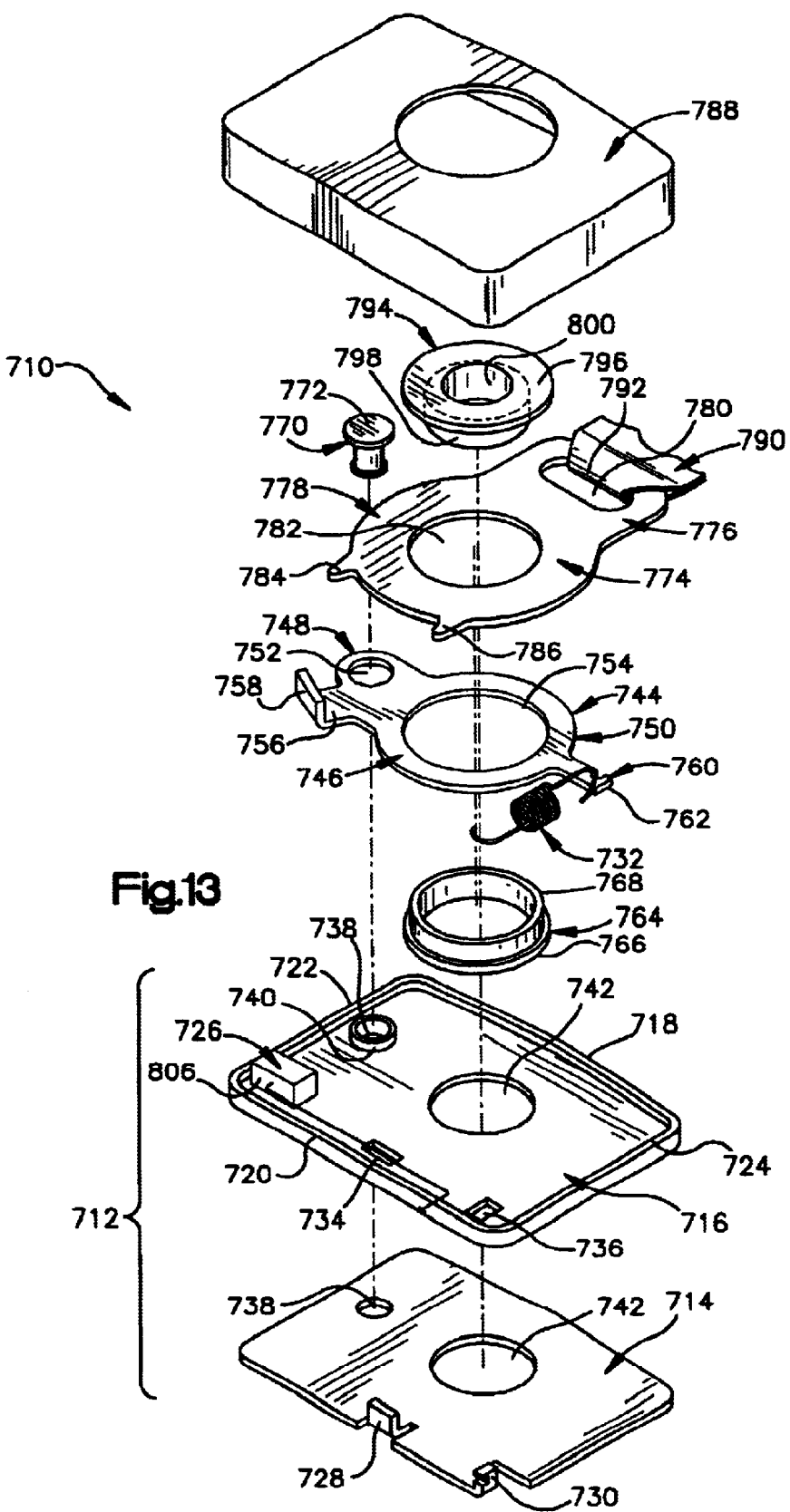
FIG. 13 is an exploded view of the embodiment of FIG. 11.

As shown in FIG. 13, two apertures extend through the guide wall 712. A first aperture 738 is located adjacent the left edge 722 of the guide wall 712 slightly nearer the upper edge 718 of the guide wall than the lower edge 720. A cylindrical protrusion 740 formed on the plastic cover plate 716 extends outwardly of the guide wall 712 and surrounds the first aperture 738. The cylindrical protrusion 740 forms a bushing. A second aperture 742 is located an equal distance between the left and right edges 722 and 724 of the guide wall 712 and slightly closer to the upper edge 718 than to the lower edge 720 of the guide wall. The second aperture 742 has a diameter that is approximately equal to one-third of the distance between the upper and lower edges 718 and 720 of the guide wall 712.

The apparatus 710 also includes an arm 744 (FIG. 13). The arm 744 has a generally pear shaped main body portion 746 with a narrow portion 748 and a wide portion 750. A first aperture 752 extends through the narrow portion 748 of the main body portion 746 of the arm 744. The first aperture 752 is sized to receive the cylindrical protrusion 740 of the guide wall 712. A second aperture 754 extends through the wide portion 750 of the main body portion 746 of the arm 744. The second aperture 754 is centrally located in the wide portion 750 of the main body portion 746 of the arm 744 and has a diameter that is approximately seventy five percent of the diameter of the wide portion of the main body portion of the arm. The diameter of the second aperture 754 in the arm is larger than the diameter of the second aperture 742 in the guide wall 712.

The arm 744 also includes two extensions. The first extension 756 extends from the narrow portion 748 of the main body portion 746 of the arm 744. The first extension 756 includes an outwardly projecting target 758. The second extension 760 extends from the wide portion 750 of the main body portion 746 of the arm 744 in a direction opposite the narrow portion 748 of the main body portion. The second extension 760 terminates in a hooked end 762. An open portion of the hooked end 762 is located on an upper edge of the second extension, as viewed in FIG. 11.

A sleeve 764 (FIG. 13) is generally cylindrical and includes a radially outwardly extending base portion 766. The sleeve 764 is secured in the second aperture 754 of the arm 744 and a cylindrical portion 768 of the sleeve extends outwardly of the wide portion 750 of the main body portion 746 of the arm, as shown in FIG. 15.

Figure 12:
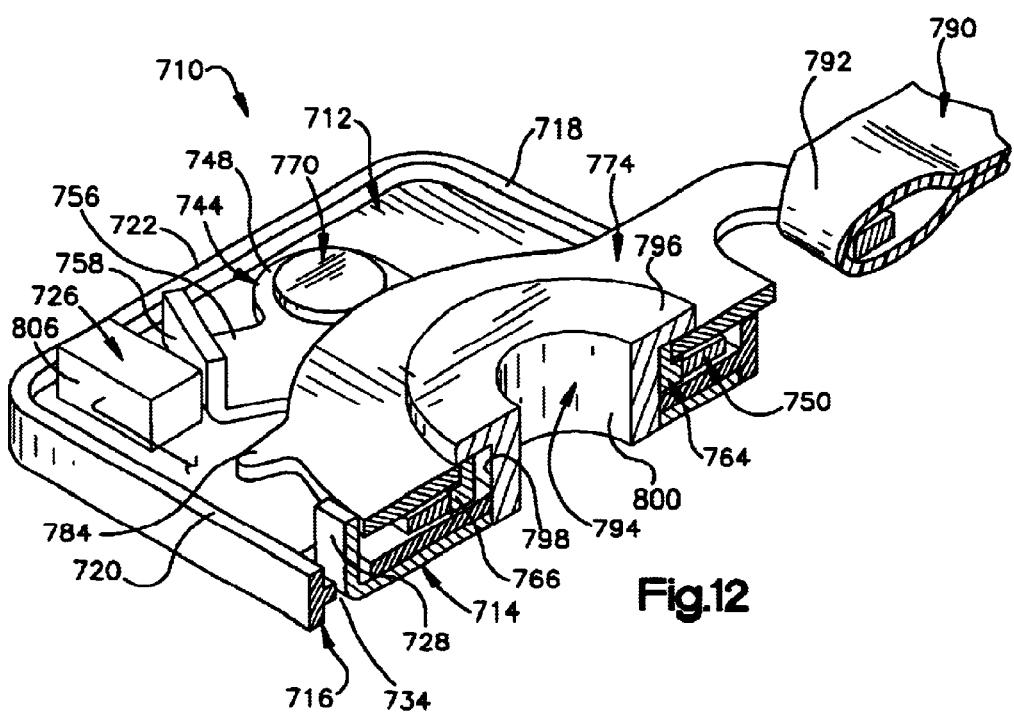
FIG. 12 is a cutaway view of the embodiment of FIG. 11.

To attach the arm 744 to the guide wall 712, the arm is positioned relative to the guide wall such that the first aperture 752 in the arm receives the cylindrical protrusion 740 of the guide wall. A pivot pin 770 or rivet is inserted into the first aperture 738 of the guide wall 712. The pivot pin 770 includes a circular head portion 772 (FIG. 13) that secures the arm 744 on the cylindrical protrusion 740 of the guide wall 712. When secured on the cylindrical protrusion 740 of the guide wall 712, the main body portion 746 of the arm 744 is spaced from the guide wall 712, as shown in FIG. 12, and is pivotal relative to the guide wall.

As shown in FIG. 11, the apparatus 710 also includes an anchor arm 774. As will be discussed in detail below, the anchor arm 774 reduces the occurrence of a variable moment acting on the arm 744 as a result of off-axis loading of the seat belt webbing 24. The anchor arm 774 is generally pear-shaped and is preferably formed from steel. The anchor arm 774 includes a narrow portion 776 and a wide portion 778. Two apertures extend through the anchor arm 774. A first aperture 780 extends through the narrow portion 776 of the anchor arm 774. A second aperture 782 (FIG. 13) extends through the wide portion 778 of the anchor arm 774. The second aperture 782 is centrally located in the wide portion 778 of the anchor arm 774 and has a diameter that is greater than the diameter of the cylindrical sleeve 764.

The anchor arm 774 also includes first and second pivot stops 784 and 786, respectively, each of which extend downwardly, as viewed in FIG. 11, from the wide portion 778 of the anchor arm 774. The first and second pivot stops 784 and 786 are spaced from one another by approximately the diameter of the second aperture 782 in the anchor arm 774.

The anchor arm 774 pivotally attaches to the cylindrical sleeve 764 of the arm 744. A bushing (not shown) may separate the anchor arm 774 from the cylindrical sleeve 764. As shown in FIG. 11, when properly positioned on the cylindrical sleeve 764, the pivot stop 728 of the guide wall 712 is located between the first and second pivot stops 784 and 786 of the anchor arm 774. The pivot stop 728 of the guide wall 712 engages the first pivot stop 784 of the anchor arm 774 to limit pivotal movement of the anchor arm in a counterclockwise direction, as viewed in FIG. 14. The pivot stop 728 of the guide wall 712 engages the second pivot stop 786 of the anchor arm 774 to limit pivotal movement of the anchor arm in a clockwise direction, as viewed in FIG. 14. In the embodiment illustrated, the anchor arm 774 may pivot relative to the arm 744 over a range of approximately forty-five degrees.

When the anchor arm 774 is attached to the sleeve 764 and thus, to the arm 744, the narrow portion 776 of the anchor arm 774 extends beyond the upper edge 718 of the guide wall 712. Thus, when a cover 788 (FIG. 13) for the apparatus 710 is attached to the guide wall 712, the narrow portion 776 of the anchor arm 774 protrudes outwardly from the cover, as shown in FIGS. 15 and 17.

A first end 792 of the anchor cable 790 is attached to the narrow portion 776 of the anchor arm 774, preferably through the first aperture 780. A second end (not shown) of the anchor cable 790 is attached to a portion of the seat belt assembly 22, preferably the buckle assembly, shown generally at 28 in FIG. 1. The anchor cable 790 may alternatively be attached to a D-ring (not shown), a retractor (not shown), or an end (not shown) of the seat belt webbing 24. When a tongue 26 associated with the seat belt webbing 24 is fastened into the buckle assembly 28, tension in the seat belt webbing is transferred through the anchor line 790 to the anchor arm 774.

The apparatus 710 also includes an overtravel stop 794. As shown in FIG. 12, the overtravel stop 794 extends through the cylindrical sleeve 764 and the second aperture of the arm 754 and is received in the second aperture 742 of the guide wall 712. When received in the second aperture 742 of the guide wall 712, the overtravel stop 794 limits the pivotal movement of the arm 744 relative to the guide wall 712, as will be discussed in detail below.

The overtravel stop 794 is generally cylindrical and includes a head portion 796 that extends radially outwardly of a cylindrical outer surface 798. A cylindrical inner surface 800 of the overtravel stop 794 defines a path for a mounting bolt 802 (FIGS. 15 and 17) to mount the apparatus 710 to an anchor plate 804.

The apparatus 710 also includes a spring 732 (FIG. 11). The spring 732 extends between the hook 730 on the guide wall 712 and the hooked end 762 of the second extension 760 of the arm 744. The spring 732 exerts a spring force on arm 744 in the direction of $F_s$ in FIG. 14. The spring force creates a moment $M_s$ on the arm that tends to rotate the arm clockwise as viewed in FIG. 14. Moment $M_s$ is approximately equal to the spring force multiplied by a distance between the center of the first aperture 752 of the arm 744, as indicated at C, and a point of contact between the spring 732 and the hooked end 762 of the second extension 760 of the arm 744. The spring 732 rotates or biases the arm 744 into an initial position, shown in FIGS. 14 and 15. When the arm 744 is in the initial position, the overtravel stop 794 contacts an upper portion of the cylindrical sleeve 764, as shown in FIG. 15, and prevents clockwise rotation of the arm 744.

Tension in the seat belt webbing results in a force on the anchor cable 790 directed in the direction $T_w$. The force creates a tension in the anchor cable 790. Tension in the anchor cable 790 pulls upwardly in the direction $T_w$ on the anchor arm 774 with a force equivalent to the tension in the anchor cable 790. As a result, the anchor arm 774 pulls upwardly in the direction $T_w$ on the arm 744. A moment $M_w$ is created that tends to rotate the arm 744 in a counterclockwise direction as viewed in FIG. 14. The moment $M_w$ is approximately equal to the force applied on the arm as a result of tension in the seat belt webbing multiplied by a distance between the center C of the first aperture 752 of the arm 744 and the center of the second aperture 754 of the arm, indicated at D. FIG. 14 illustrates, the distance between the center C of the first aperture 752 of the arm 744 and the center of the second aperture 754 of the arm is approximately equal to half of the axial length of the arm.

When moment $M_w$ exceeds moment $M_s$, the arm 744 pivots in the counterclockwise direction relative to the guide wall 712 and away from the initial position. As the arm 744 moves away from the initial position, the spring 732 is stretched and the spring force $F_s$ increases. As a result, moment $M_s$ increases. The arm 744 pivots away from the initial position until moment $M_s$ equals moment $M_w$.

At a threshold tension in the anchor cable 790, the arm 744 will have pivoted away from the initial position by a predetermined amount as shown in FIGS. 16 and 17. A lower portion of the cylindrical sleeve 764 of the arm 744 contacts the overtravel stop 794, as shown in FIG. 17, to prevent further pivoting of the arm away from the initial position. Any tension in the anchor cable 790 above the threshold tension will not result in further movement of the arm 744 relative to the guide wall 712. The overtravel stop 794 and the mounting bolt 802 that passes through the overtravel stop resist the increased tension.

When the arm 744 is away from the initial position and the tension in the anchor cable 790 decreases below the threshold tension, the arm pivots in the clockwise direction toward the initial position until moment $M_s$ equals moment $M_w$. If moment $M_s$ is greater than moment $M_w$, the arm 744 returns to the initial position and further rotation in the clockwise direction will be prevented.

The anchor arm 774 of the apparatus 710 reduces the occurrence of a variable moment on the arm that may result from off-axis loading of the seat belt webbing 24. Off-axis loading of the seat belt webbing 24 is defined as loading of the seat belt webbing in a direction other than in the direction of $T_w$ shown in FIG. 14. For example, if the seat belt webbing 24 and thus, the anchor cable 790, is moved upward and rightward, as viewed in FIG. 14, with a force equivalent to $T_w$, the anchor arm 774 pivots on the cylindrical sleeve 764 of the arm 744. By pivoting, the anchor arm 774 aligns the force caused by tension in the seat belt webbing with the center D of the second aperture 754 of the arm 744. Since the anchor arm 774 extends upward from the arm 744, if for example, the anchor arm 774 was not pivotal, a force directed upward and rightward would reduce the distance between the center C of the first aperture 752 of the arm 744, and the location of the upward force acting on the arm. Moreover, if the anchor arm 774 was not pivotal, an upward and leftward acting force would increase the distance between the center C and the location of the upward force on the arm 744. By pivoting, the anchor arm 774 reduced a change in moment $M_w$ that may result from tensioning of the seat belt webbing 24 in an off-axis direction.

A sensor 726 monitors the movement of the arm 744 relative to the guide wall 712. The sensor 726 illustrated is a back-biased Hall effect device. The sensor 726 includes a subassembly 806 that includes a magnet and a device for measuring magnet flux. The magnet of the subassembly 806 produces magnet flux. The magnet flux changes as the target 758 of the first extension 756 of the arm 744 moves relative to the subassembly 806. Thus, the device detects a change in the magnetic flux that results from movement of the target 758.

As previously noted, as an alternative to the anchor cable, webbing, a metal strap, or any other elongated member may be used. The choice of material for the anchor cable will not alter the overall design of any of the embodiments of the present invention.

From the above description of the invention, those skilled in the art will perceive improvements, changes and modifications. Such improvements, changes and modifications within the skill of the art are intended to be covered by the appended claims.

Having described the invention, we claim the following:

1. An apparatus comprising:
   seat belt webbing;
   an elongated member connected with the seat belt webbing, tension in the seat belt webbing being transmitted to the elongated member;
   a support;
   an arm associated with the elongated member, the arm having an axial length and first and second parts, the first part of the arm being connected to the support and the second part of the arm receiving a force from the elongated member when tension in the seat belt webbing increases, the first and second parts of the arm being spaced apart from one another so that the force acts on the arm through a moment arm to move at least a portion of the arm relative to the support; and
   a device responsive to movement of the at least a portion of the arm due to the torsion force to provide an output signal indicative of the tension in the seat belt webbing, the first and second parts of the arm being spaced apart from one another by a distance that is at least one half of the axial length of the arm.

2. The apparatus as defined in claim 1 wherein a portion of the elongated member opposite the seat belt webbing is attached with a vehicle.

3. The apparatus as defined in claim 1 wherein a portion of the elongated member opposite the seat belt webbing is attached to the arm.

4. The apparatus as defined in claim 1 wherein the arm rotates in response to the force.

5. The apparatus as defined in claim 4 wherein the device is mounted adjacent the arm and measures displacement rotation of the arm.

6. The apparatus as defined in claim 4 further including a pivot connecting the arm to the support and defining an axis of rotation of the arm.

7. The apparatus as defined in claim 6 wherein the device is mounted on the support adjacent the arm, the device measuring movement of the arm relative to the support.

8. The apparatus as defined in claim 6 wherein the device is a magnetic position sensor and comprises a magnet and a sensor, the magnet being fixed to the arm and movable with the arm, the sensor being attached to the support adjacent the arm, movement of the magnet relative to the sensor indicating rotation of the arm relative to the support.

9. The apparatus as defined in claim 1 wherein at least a portion of the arm bends in response to the force.

10. The apparatus as defined in claim 9 further including a fastener attaching the arm to the support, the torsion force moving an end of the arm relative to the fastener to bend the arm.

11. The apparatus as defined in claim 10 wherein the arm includes a beam, bending of the arm causing bending of the beam, and the device being a strain gauge that is attached to the beam and measures strain on the beam.

12. The apparatus as defined in claim 10 wherein a torsion bar also attaches the arm to the support, the arm including a beam that extends between the fastener and the torsion bar, the beam bending in response to movement of the end of the arm.

13. The apparatus as defined in claim 12 wherein the device is a strain gauge that is attached to the beam of the arm and senses strain in the beam.

14. The apparatus as defined in claim 10 further including an overtravel stop, the overtravel stop extending through a portion of the arm and preventing further bending of the arm when tension in the seat belt webbing increases above a threshold value.

15. The apparatus as defined in claim 1 further including structure for reducing a variable moment acting on the arm as a result of off-axis loading of the seat belt webbing.

16. The apparatus as defined in claim 15 wherein the structure includes an anchor arm that is pivotally connected to the arm and that connects the elongated member and the arm, the anchor arm pivoting during off-axis loading of the seat belt webbing to direct a force caused by tension in the seat belt webbing toward a predetermined location of the arm.

17. The apparatus as defined in claim 1 further including a buckle assembly and a tongue, the tongue being attached to the seat belt webbing and the buckle assembly being attached to the elongated member, the buckle assembly receiving the tongue to connect the elongated member with the seat belt webbing.

18. The apparatus as defined in claim 1 wherein the elongated member is one of an anchor cable, webbing, and a strap.

19. An apparatus comprising:
seat belt webbing;
an elongated member connected with the seat belt webbing, tension in the seat belt webbing being transmitted to the elongated member;
a sensor comprising:
a support;
an arm associated with the elongated member and connected to the support, the elongated member moving at least a portion of the arm relative to the support in response to a change in tension in the seat belt webbing, and
a device responsive to movement of the at least a portion of the arm to provide an output signal indicative of the tension in the seat belt webbing; and
structure for reducing a variable moment acting on the arm as a result of off-axis loading of the seat belt webbing, the structure including a bushing for maintaining a predetermined angle between the arm and the elongated member independent of a position of the seat belt webbing relative to the arm.

20. The apparatus as defined in claim 19 wherein the arm rotates in response to a change in tension in the seat belt webbing.

21. The apparatus as defined in claim 20 further including a pivot connecting the arm to the support and defining an axis of rotation of the arm.

22. The apparatus as defined in claim 21 wherein the support supports the structure.

23. The apparatus as defined in claim 21 wherein the device is mounted on the support adjacent the arm, the device measuring movement of the arm relative to the support.

24. The apparatus as defined in claim 19 wherein the device is mounted adjacent the arm and measures displacement of the arm.

25. The apparatus as defined in claim 24 wherein the device is a magnetic position sensor and comprises a magnet and means for sensing the position of the magnet, the magnet being fixed to the arm and movable with the arm, the means being attached to the support adjacent the arm, movement of the magnet relative to the means indicating rotation of the arm relative to the support.

26. The apparatus as defined in claim 19 further including a buckle assembly and a tongue, the tongue being attached to the seat belt webbing and the buckle assembly being attached to the elongated member, the buckle assembly receiving the tongue to connect the elongated member with the seat belt webbing.

27. The apparatus as defined in claim 19 wherein the elongated member is one of an anchor cable, webbing, and a strap.

28. The apparatus as defined in claim 19 further including a pretensioner, an end of the elongated member opposite the seat belt webbing being connected with the pretensioner, the pretensioner including an actuatable source of energy for, when actuated, moving the elongated member to tension the seat belt webbing.

29. The apparatus as defined in claim 28 wherein the pretensioner is attached to the support.

30. An apparatus comprising:
seat belt webbing;
an elongated member connected with the seat belt webbing, tension in the seat belt webbing being transmitted to the elongated member;
an arm associated with the elongated member, the elongated member moving at least a portion of the arm in a first direction in response to the an increase in tension in the seat belt webbing;

an overtravel stop extending through a portion of the arm, the overtravel stop contacting the arm after movement of the arm in the first direction by a predetermined amount, the overtravel stop preventing continued movement of the arm in the first direction and carrying loads associated with further increases in tension in the seat belt webbing;

a device responsive to movement of the at least a portion of the arm to provide an output signal indicative of the tension in the seat belt webbing.

31. The apparatus as defined in claim 30 further including a mounting bolt, the mounting bolt extending through the overtravel stop and attaching the overtravel stop to a vehicle.

32. The apparatus as defined in claim 30 wherein the arm rotates in the first direction in response to the increase in tension in the seat belt webbing.

33. The apparatus as defined in claim 32 wherein the device is mounted adjacent the arm and measures displacement of the arm.

34. The apparatus as defined in claim 32 further including an support, a pivot connecting the arm to the support and defining an axis of rotation of the arm.

35. The apparatus as defined in claim 34 wherein the device is mounted on the support adjacent the arm, the device measuring movement of the arm relative to the support.

36. The apparatus as defined in claim 34 further including a biasing element, the biasing element extending between the arm and the support for biasing the arm in a second direction, opposite the first direction, the arm rotating in the first direction in response to tension in the seat belt webbing that overcomes a biasing force of the biasing element.

37. The apparatus as defined in claim 34 wherein the device is a magnetic position sensor and comprises a magnet and a sensor, the magnet being fixed to the arm and movable with the arm, the sensor being attached to the support adjacent the arm, movement of the magnet relative to the sensor indicating rotation of the arm.

38. The apparatus as defined in claim 32 further including an support, a torsion bar attaching the arm to the support, the increase in tension in the seat belt webbing rotating the arm relative to the support and twisting the torsion bar.

39. The apparatus as defined in claim 30 wherein the arm bends in response to the increase in tension in the seat belt webbing.

40. The apparatus as defined in claim 39 further including an support, a fastener attaching the arm to the support, the increase in tension in the seat belt webbing moving an end of the arm relative to the fastener to bend the arm.

41. The apparatus as defined in claim 40 wherein the arm includes a beam, bending of the arm causing bending of the beam, and the device being a strain gauge that is attached to the beam and measures strain on the beam.

42. The apparatus as defined in claim 40 wherein a torsion bar also attaches the arm to the support, the arm including a beam that extends between the fastener and the torsion bar, the beam bending in response to movement of the end of the arm.

43. The apparatus as defined in claim 42 wherein the device is a strain gauge that is attached to the beam of the arm and senses strain in the beam.

44. The apparatus as defined in claim 30 further including structure for reducing a variable moment acting on the arm as a result of off-axis loading of the seat belt webbing.

45. The apparatus as defined in claim 44 wherein the structure includes a bushing for maintaining a predetermined angle between the arm and the elongated member independent of a position of the seat belt webbing relative to the arm.

46. The apparatus as defined in claim 44 wherein the structure includes an anchor arm that is pivotally connected to the arm and that connects the elongated member and the arm, the anchor arm pivoting during off-axis loading of the seat belt webbing to direct loads toward a predetermined location of the arm.

47. The apparatus as defined in claim 30 further including a buckle assembly and a tongue, the tongue being attached to the seat belt webbing and the buckle assembly being attached to the elongated member, the buckle assembly receiving the tongue to connect the elongated member with the seat belt webbing.

48. The apparatus as defined in claim 30 wherein the elongated member is one of an anchor cable, webbing, and a strap.

49. The apparatus as defined in claim 30 further including a pretensioner, an end of the elongated member opposite the seat belt webbing being connected with the pretensioner, the pretensioner including an actuatable source of energy for, when actuated, moving the elongated member to tension the seat belt webbing.

50. The apparatus as defined in claim 49 wherein the arm is supported by the pretensioner, the elongated member moving at least a portion of the arm relative to the pretensioner as tension in the seat belt webbing increases.

51. An apparatus comprising:

seat belt webbing;

an elongated member connected with the seat belt webbing, tension in the seat belt webbing being transmitted to the elongated member;

an arm associated with the elongated member and receiving a load from the elongated member, the elongated member moving at least a portion of the arm in a first direction in response to an increase in tension in the seat belt webbing;

a biasing element for biasing the arm in a second direction opposite the first direction; and a sensor responsive to movement of the at least a portion of the arm to provide an output signal indicative of the tension in the seat belt webbing;

the sensor located out of a path of the load applied by the elongated member to the arm so that no portion of the load is transferred through the sensor.

52. The apparatus as defined in claim 51 wherein the arm rotates in response to a change in tension in the seat belt webbing.

53. The apparatus as defined in claim 52 wherein the sensor is mounted adjacent the arm and measures displacement of the arm.

54. The apparatus as defined in claim 55 wherein the sensor is a magnetic position sensor and comprises a magnet and a device for sensing the position of the magnet, the magnet being fixed to the arm and movable with the arm, the device being attached to the support adjacent the arm, movement of the magnet relative to the device indicating rotation of the arm relative to the support.

55. The apparatus as defined in claim 52 further including an support, a pivot connecting the arm to the support and defining an axis of rotation of the arm.

56. The apparatus as defined in claim 55 wherein the sensor is mounted on the support adjacent the arm, the sensor measuring movement of the arm relative to the support.

57. The apparatus as defined in claim 56 wherein the biasing element extends between the arm and the support for biasing the arm in the second direction.

58. The apparatus as defined in claim 51 further including structure for reducing a variable moment acting on the arm as a result of off-axis loading of the seat belt webbing.

59. The apparatus as defined in claim 58 wherein the structure includes an anchor arm that is pivotally connected to the arm and that connects the elongated member and the arm, the anchor arm pivoting during off-axis loading of the seat belt webbing to direct loads toward a predetermined location of the arm.

60. The apparatus as defined in claim 51 further including a buckle assembly and a tongue, the tongue being attached to the seat belt webbing and the buckle assembly being attached to the elongated member, the buckle assembly receiving the tongue to connect the elongated member with the seat belt webbing.

61. The apparatus as defined in claim 51 wherein the elongated member is one of an anchor cable, webbing, and a strap.

62. The apparatus as defined in claim 51 wherein movement of the arm in response to changes in tension in the seat belt webbing will not alter operation of the sensor in returning to a reading of zero tension when tension in removed from the seat belt webbing.

63. The apparatus as defined in claim 51 further including a pretensioner, an end of the elongated member opposite the seat belt webbing being connected with the pretensioner, the pretensioner including an actuatable source of energy for, when actuated, moving the elongated member to tension the seat belt webbing.

64. The apparatus as defined in claim 63 wherein the arm is supported by the pretensioner, the elongated member moving at least a portion of the arm relative to the pretensioner as tension in the seat belt webbing increases.

65. An apparatus comprising:
  seat belt webbing;
  a seat belt webbing pretensioner comprising:
    an elongated member connected with the seat belt webbing, tension in the seat belt webbing being transmitted to the elongated member; and
    an actuatable source of energy for, when actuated, moving the elongated member to tension the seat belt webbing; and
  a sensor for sensing tension in the seat belt webbing, the sensor comprising:
    an arm being supported by the pretensioner and being associated with the elongated member, the elongated member moving at least a portion of the arm relative to the pretensioner in response to a change in tension in the seat belt webbing; and
    a device responsive to relative movement between the at least a portion of the arm and the pretensioner to provide an output signal indicative of tension in the seat belt webbing.

66. The apparatus as defined in claim 65 wherein the arm rotates in response to a change in tension in the seat belt webbing.

67. The apparatus as defined in claim 66 wherein the device is mounted adjacent the arm and measures displacement of the arm.

68. The apparatus as defined in claim 67 further including a biasing element, the biasing element extending between the arm and the pretensioner for biasing the arm in a first direction relative to the pretensioner, the arm rotating in a second direction, opposite the first direction, when the tension in the seat belt webbing overcomes a biasing force of the biasing element.

69. The apparatus as defined in claim 66 further including a pivot connecting the arm to the pretensioner and defining an axis of rotation of the arm.

70. The apparatus as defined in claim 69 wherein the device is mounted on the pretensioner adjacent the arm, the device measuring movement of the arm relative to the pretensioner.

71. The apparatus as defined in claim 70 wherein the device is a magnetic position sensor and comprises a magnet and means for sensing the position of the magnet, the magnet being fixed to the arm and movable with the arm, the means being attached to the pretensioner adjacent the arm, movement of the magnet relative to the means indicating rotation of the arm.

72. The apparatus as defined in claim 71 wherein the pretensioner includes an overtravel stop, the overtravel stop extending through a portion of the arm and preventing further movement of the arm when tension in the seat belt webbing increases above a threshold value and wherein the apparatus further includes structure for reducing a variable moment acting on the arm as a result of off-axis loading of the seat belt webbing.

73. The apparatus as defined in claim 66 wherein the pretensioner includes an overtravel stop, the overtravel stop extending through a portion of the arm and preventing further movement of the arm when tension in the seat belt webbing increases above a threshold value.

74. The apparatus as defined in claim 66 further including a torsion bar attaching the arm to the pretensioner, an increase in tension in the seat belt webbing rotating the arm relative to the pretensioner and twisting the torsion bar.

75. The apparatus as defined in claim 65 wherein the arm bends in response to the change in tension in the seat belt webbing.

76. The apparatus as defined in claim 75 further including a fastener attaching the arm to the pretensioner, the elongated member moving an end of the arm relative to the fastener to bend the arm.

77. The apparatus as defined in claim 76 wherein the arm includes a beam, bending of the arm causing bending of the beam, and the device being a strain gauge that is attached to the beam and measures strain on the beam.

78. The apparatus as defined in claim 76 wherein a torsion bar also attaches the arm to the pretensioner, the arm including a beam that extends between the fastener and the torsion bar, the beam bending in response to movement of the end of the arm.

79. The apparatus as defined in claim 78 wherein the device is a strain gauge that is attached to the beam of the arm and senses strain in the beam.

80. The apparatus as defined in claim 65 further including structure for reducing a variable moment acting on the arm as a result of off-axis loading of the seat belt webbing.

81. The apparatus as defined in claim 80 wherein the structure includes a bushing for maintaining a predetermined angle between the arm and the elongated member independent of a position of the seat belt webbing relative to the arm.

82. The apparatus as defined in claim 81 wherein a biasing element extends between the bushing and the arm and biases the arm in a first direction relative to the pretensioner, the arm rotating in a second direction, opposite the first direction, when tension in the seat belt webbing overcomes a biasing force of the biasing element.

83. The apparatus as defined in claim 65 further including a buckle assembly and a tongue, the tongue being attached to the seat belt webbing and the buckle assembly being attached to the elongated member, the buckle assembly receiving the tongue to connect the elongated member with the seat belt webbing.

84. The apparatus as defined in claim 65 wherein the elongated member is one of an anchor cable, webbing, and a strap.

85. An apparatus comprising:

seat belt webbing;

an elongated member connected with the seat belt webbing, tension in the seat belt webbing being transmitted to the elongated member;

a support;

an arm associated with the elongated member and connected to the support, the arm receiving a force from the elongated member when tension in the seat belt webbing increases, the force acting on the arm through a moment arm to move at least a portion of the arm relative to the support, movement of the at least a portion of the arm relative to the support being rotation of the arm;

a device responsive to movement of the at least a portion of the arm to provide an output signal indicative of the tension in the seat belt webbing;

a pivot connecting the arm to the support and defining an axis of rotation of the arm; and a biasing element, the biasing element extending between the arm and the support for biasing the arm in a first direction relative to the support, the arm rotating in a second direction, opposite the first direction, when the force from tho elongated member overcomes a biasing force of the biasing element.

86. An apparatus comprising:

seat belt webbing;

an elongated member connected with the seat belt webbing, tension in the seat belt webbing being transmitted to the elongated member;

a support;

an arm associated with the elongated member and connected to the support, the arm receiving a force from the elongated member when tension in the seat belt webbing increases, the force acting on the arm through a moment arm to move at least a portion of the arm relative to the support, movement of the at least a portion of the arm relative to the support being rotation of the arm;

a device responsive to movement of the at least a portion of the arm to provide an output signal indicative of the tension in the seat belt webbing; and an overtravel stop, the overtravel stop extending through a portion of the arm and preventing further rotation of the arm when tension in the seat belt webbing increases above a threshold value.

87. An apparatus comprising:

seat belt webbing;

an elongated member connected with the seat belt webbing, tension in the seat belt webbing being transmitted to the elongated member;

a support;

an arm associated with the elongated member and connected to the support, the arm receiving a force from the elongated member when tension in the seat belt webbing increases, the force acting on the arm through a moment arm to move at least a portion of the arm relative to the support;

a device responsive to movement of the at least a portion of the arm to provide an output signal indicative of the tension in the seat belt webbing; and structure for reducing a variable moment acting on the arm as a result of off-axis loading of the seat belt webbing, the structure including a bushing for maintaining a predetermined angle between the arm and the elongated member independent of a position of the seat belt webbing relative to the arm.

88. An apparatus comprising:

seat belt webbing;

an elongated member connected with the seat belt webbing, tension in the seat belt webbing being transmitted to the elongated member;

a sensor comprising
 a support;
 an arm associated with the elongated member and connected to the support, the elongated member moving at least a portion of the arm relative to the support in response to a change in tension in the seat belt webbing, movement of the at least a portion of the arm relative to the support being rotation of the arm; and
 a device responsive to movement of the at least a portion of the arm to provide an output signal indicative of the tension in the seat belt webbing; and structure for reducing a variable moment acting on the arm as a result of off-axis loading of the seat belt webbing;

a pivot connecting the arm to the support and defining an axis of rotation of the arm; and a biasing element, the biasing element extending between the arm and the support for biasing the arm in a first direction relative to the support, the arm rotating in a second direction, opposite the first direction, when the tension in the seat belt webbing overcomes a biasing force of the biasing element.

89. An apparatus comprising:

seat belt webbing;

an elongated member connected with the seat belt webbing, tension in the seat belt webbing being transmitted to the elongated member;

a sensor comprising:
 an arm associated with the elongated member, the elongated member moving at least a portion of the arm in response to a change in tension in the seat belt webbing, and
 a device responsive to movement of the at least a portion of the arm to provide an output signal indicative of the tension in the seat belt webbing;

structure for reducing a variable moment acting on the arm as a result of off-axis loading of the seat belt webbing; and an overtravel stop, the overtravel stop extending through a portion of the arm and preventing further movement of the arm when tension in the seat belt webbing increases above a threshold value.

90. An apparatus comprising:

seat belt webbing;

an elongated member connected with the seat belt webbing, tension in the seat belt webbing being transmitted to the elongated member;

an arm associated with the elongated member and receiving a load from the elongated member, the elongated member moving at least a portion of the arm in a first direction in response to an increase in tension in the seat belt webbing;

a biasing element for biasing the arm in a second direction opposite the first direction;

a sensor responsive to movement of the at least a portion of the arm to provide an output signal indicative of the tension in the seat belt webbing, the sensor being located out of a path of the load applied by the elongated member to the arm; and an overtravel stop, the overtravel stop extending through a portion of the arm and preventing further movement of the arm in the first direction when tension in the seat belt webbing increases above a threshold value.

91. An apparatus comprising:

seat belt webbing;

an elongated member connected with the seat belt webbing, tension in the seat belt webbing being transmitted to the elongated member;

an arm associated with the elongated member and receiving a load from the elongated member, the elongated member moving at least a portion of the arm in a first direction in response to an increase in tension in the seat belt webbing;

a biasing element for biasing the arm in a second direction opposite the first direction;

a sensor responsive to movement of the at least a portion of the arm to provide an output signal indicative of the tension in the seat belt webbing, the sensor located out of a path of the load applied by the elongated member to the arm; and structure for reducing a variable moment acting on the arm as a result of off-axis loading of the seat belt webbing, the structure including a bushing for maintaining a predetermined angle between the arm and the elongated member independent of a position of the seat belt webbing relative to the arm.

* * * * *

UNITED STATES PATENT AND TRADEMARK OFFICE
CERTIFICATE OF CORRECTION

PATENT NO. : 6,851,715 B2
DATED : February 8, 2005
INVENTOR(S) : Scott D. Devereaux et al.

It is certified that error appears in the above-identified patent and that said Letters Patent is hereby corrected as shown below:

Column 22,
Line 66, after "arm" delete "due to the torsion force".

Column 23,
Line 29, before "force" delete "torsion".

Column 25,
Lines 22, 41 and 48, before "support" change "an" to -- a --.

Column 26,
Line 59, before "support" change "an" to -- a --.

Column 29,
Line 25, before "elongated" change "tho" to -- the --.

Signed and Sealed this

Fifth Day of July, 2005

JON W. DUDAS
*Director of the United States Patent and Trademark Office*